US010498803B1

United States Patent
Zini et al.

(10) Patent No.: US 10,498,803 B1
(45) Date of Patent: Dec. 3, 2019

(54) IDENTIFYING COMMUNICATING NETWORK NODES IN THE SAME LOCAL NETWORK

(71) Applicant: XM Cyber LTD., Hertzelia (IL)

(72) Inventors: Shahar Zini, Chatswood (AU); Menahem Lasser, Kohav-Yair (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

(21) Appl. No.: 16/537,601

(22) Filed: Aug. 11, 2019

Related U.S. Application Data

(62) Division of application No. 16/128,718, filed on Sep. 12, 2018, now Pat. No. 10,440,044.

(60) Provisional application No. 62/654,463, filed on Apr. 8, 2018.

(51) Int. Cl.
*H04L 29/08* (2006.01)
*H04L 29/12* (2006.01)

(52) U.S. Cl.
CPC .......... *H04L 67/10* (2013.01); *H04L 61/2007* (2013.01); *H04L 61/6022* (2013.01)

(58) Field of Classification Search
CPC ........ H04W 4/06; H04W 76/40; H04W 88/16
See application file for complete search history.

(56) References Cited

U.S. PATENT DOCUMENTS

| | | | | |
|---|---|---|---|---|
| 2006/0114903 A1* | 6/2006 | Duffy, IV | ........... | H04L 12/1854 370/390 |
| 2010/0027551 A1* | 2/2010 | Arkin | ................. | H04L 29/12028 370/400 |
| 2012/0254922 A1* | 10/2012 | Rangarajan | ......... | H04L 12/5692 725/62 |
| 2013/0217332 A1* | 8/2013 | Altman | .................. | H04H 60/90 455/41.2 |
| 2015/0200735 A1* | 7/2015 | Tjahjono | ................ | H04H 20/72 370/312 |
| 2015/0304116 A1* | 10/2015 | Chan | ....................... | H04L 12/18 370/230 |
| 2015/0381382 A1* | 12/2015 | Anumala | ............ | H04L 12/1886 370/390 |

* cited by examiner

*Primary Examiner* — Christopher C Harris
(74) *Attorney, Agent, or Firm* — Marc Van Dyke; Fourth Dimension IP

(57) ABSTRACT

Methods and systems for executing a penetration test of a networked system by a penetration testing system so as to determine a method by which an attacker could compromise the networked system, and/or for distributing common sets of data to nodes of a networked system. The methods and systems include identifying network nodes which have shared broadcast domains.

20 Claims, 15 Drawing Sheets

ALL STEPS ARE CARRIED OUT BY THE PENETRATION TESTING SOFTWARE MODULE

Receive S01 (from the 1st network node) 1st information about a 1st data packet, the 1st data packet being one member of the group consisting of (i) a data packet received by the 1st network node from another network node sharing a common broadcast domain with the 1st network node, and (ii) a data packet sent by the 1st network node only to one or more other network nodes sharing a common broadcast domain with the 1st network node, wherein execution of computer code of the reconnaissance agent software module by one or more processors of the 1st network node causes the one or more processors of the 1st network node to send the 1st information;

Receive S02 (from the 2nd network node), 2nd information about a 2nd data packet, the 2nd data packet being one member of the group consisting of (i) a data packet received by the 2nd network node from another network node sharing a common broadcast domain with the 2nd network node, and (ii) a data packet sent by the 2nd network node only to one or more other network nodes sharing a common broadcast domain with the 2nd network node, wherein execution of computer code of the reconnaissance agent software module by one or more processors of the 2nd network node causes the one or more processors of the 2nd network node to send the 2nd information Check S03 whether the 1st information and the 2nd information satisfy a matching condition

S04 in response to a determination by the checking (Step S03) that the 1st information and 2nd information satisfy a matching condition, carry out the following:

Conclude S04-1 that the 1st data packet and the 2nd data packet are the same data packet and that the 1st network node and the 2nd network node share a common broadcast domain Determine S04-2 the method by which the attacker could compromise the networked system, wherein the method by which the attacker could compromise includes a step that depends on the 1st network node and the 2nd network node sharing the common broadcast domain Report S05 the method determined in Step S04-2, the reporting comprising at least one member of the group consisting of (i) causing a display device to display a report including information about the determined method by which the attacker could compromise the networked system, (ii) recording the report including the information about the determined method by which the attacker could compromise the networked system in a file, and (iii) electronically transmitting the report including the information about the determined method by which the attacker could compromise the networked system

FIG. 5

INSTRUCTIONS 116
COMPRISING 5 GROUPS OF PROGRAM
INSTRUCTIONS (GPI3 ... GPI7)

GPI3 for receiving, from the 1st network node, 1st information sent by the 1st network node about a 1st data packet

GPI4 for receiving, from the 2nd network node, sent by the 2nd network node about a 2nd data packet

GPI5 for checking whether the 1st information and the 2nd information satisfy a matching condition

GPI6 for executing 2 subgroups of program instructions GPI6-1, GPI6-2 (See FIG. 7D) in response to a determination made when executing the program instructions of GPI5 that the 1st information and the 2nd information satisfy a matching condition

GPI7 for reporting the determined method by which the attacker could compromise the networked system, wherein the reporting comprises at least one member of the group consisting of (i) causing a display device to display a report including information about the determined method by which the attacker could compromise the networked system, (ii) recording the report including the information about the determined method by which the attacker could compromise the networked system in a file, and (iii) electronically transmitting the report including the information about the determined method by which the attacker could compromise the networked system

PENETRATION-TESTING NON-TRANSITORY
COMPUTER-READABLE STORAGE MEDIUM 182

FIG. 7C

ALL STEPS ARE CARRIED OUT BY THE DATA DISTRIBUTION SERVER SOFTWARE MODULE

Receive S11 (from the 1$^{st}$ network node) 1$^{st}$ information about a 1$^{st}$ data packet, the 1$^{st}$ data packet being one member of the group consisting of (i) a data packet received by the 1$^{st}$ network node from another network node sharing a common broadcast domain with the 1$^{st}$ network node, and (ii) a data packet sent by the 1$^{st}$ network node only to one or more other network nodes sharing a common broadcast domain with the 1$^{st}$ network node, wherein execution of computer code of the data distribution agent software module by one or more processors of the 1$^{st}$ network node causes the one or more processors of the 1$^{st}$ network node to send the 1$^{st}$ information;

Receive S12 (from the 2$^{nd}$ network node), 2$^{nd}$ information about a 2$^{nd}$ data packet, the 2$^{nd}$ data packet being one member of the group consisting of (i) a data packet received by the 2$^{nd}$ network node from another network node sharing a common broadcast domain with the 2$^{nd}$ network node, and (ii) a data packet sent by the 2$^{nd}$ network node only to one or more other network nodes sharing a common broadcast domain with the 2$^{nd}$ network node, wherein execution of computer code of the data distribution agent software module by the one or more processors of the 2$^{nd}$ network node causes the one or more processors of the 2nd network node to send the 2$^{nd}$ information Check S13 whether the 1$^{st}$ information and the 2$^{nd}$ information satisfy a matching condition

S14 in response to a determination by the checking (Step S13) that the 1$^{st}$ information and 2$^{nd}$ information satisfy a matching condition, carry out the following:

Conclude S14-1 that the 1$^{st}$ data packet and the 2$^{nd}$ data packet are the same data packet and that the 1$^{st}$ network node and the 2$^{nd}$ network node share a common broadcast domain Deliver S14-2 the common set of data to multiple network nodes of the common broadcast domain, the delivering comprising:
(A) transmitting the common set of data to the first network node, and
(B) causing the first network node to transmit the common set of data from the first network node to the second network node

FIG. 9

IDENTIFYING COMMUNICATING NETWORK NODES IN THE SAME LOCAL NETWORK

CROSS-REFERENCE TO RELATED APPLICATIONS

This patent application is a divisional of U.S. patent application Ser. No. 16/128,718 which was filed on Sep. 12, 2018 and which is incorporated herein by reference in its entirety. U.S. patent application Ser. No. 16/128,718 claims the benefit of U.S. Provisional Patent Application No. 62/654,463 filed on Apr. 8, 2018, which is incorporated herein by reference in its entirety.

FIELD OF THE INVENTION

The present invention relates to systems and methods for identifying communicating network nodes in networked systems that share a broadcast domain, and using such identification for penetration testing of the networked systems to determine security vulnerabilities, and/or for distribution of common sets of data to the communicating network nodes.

BACKGROUND

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization or even of only a portion of it might cause a significant damage, up to completely shutting down all operations. Additionally, all data of the organization exists somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one computing node, they are subject to attacks by computer hackers or by hostile adversaries. Quite often the newspapers are reporting incidents in which websites crashed, sensitive data was stolen or service to customers was denied, where the failures were the results of hostile penetration into an organization's networked computing system.

As a result, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even rich organizations that can afford hiring talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

Within a computer network, a "broadcast domain" is a logical division of the computer network, in which all network nodes can reach each other by broadcasting at the data link layer. In other words, each network node in a broadcast domain can transmit a data link broadcast message that is addressed to all other network nodes within its broadcast domain, and all those other network nodes in its domain are expected to receive the broadcast message.

As stated above, a broadcast domain is inherently tied to the data link layer, which is layer 2 of the OSI network layers model. This implies, that in terms of current networking technologies, any computers connected to the same Ethernet repeater or layer-2-switch are members of the same broadcast domain. However, layer 3 devices, such as routers and layer-3-switches, form boundaries between broadcast domains.

Multiple broadcast domains may be connected to a larger network through routers or layer-3-switches. Network nodes that are members of the same broadcast domain communicate with each other at layer 2 of the network and address each other using MAC (Media Access Control) addresses. A MAC address of a network node is an identifier assigned to the network interface of the node and is typically stored in hardware.

However, layer 2 messages do not cross boundaries between broadcast domains, and therefore network nodes that are members of different broadcast domains communicate with each other at level 3 of the network and address each other using IP addresses.

Penetration testing systems need to know which network nodes of the tested networked system share a common broadcast domain. This is required in order to correctly assess the effectiveness of certain cyber-attacks which might be used by hostile attackers against the tested networked system.

In order to understand why this is so, the following example examines the well-known ARP Spoofing cyber-attack.

The ARP (Address Resolution Protocol) protocol is a network protocol used for discovering the link layer address associated with a given IPv4 address. Suppose that a first node needs to communicate with a second node in its broadcast domain, but it only knows the IP address of the second node, not its MAC address. As the MAC address is essential for sending a message to the second node, the following sequence of operations will take place:

a. The first node will look into its cached ARP table and search for the known IP address of the second node.
b. If an entry for that IP address is found, the entry contains the MAC address of the second node.
c. Otherwise, the first node will send out an ARP request message. An ARP request message is a layer 2 broadcast message that is received and read by all other nodes in the broadcast domain of the sending node. The ARP request contains the known IP address of the second node, plus both MAC address and IP address of the sending node (the first node in this example).
d. When the second node receives the ARP request message and identifies the IP address included in the message to be its own IP address, it responds by sending out an ARP reply message. An ARP reply message is also a layer 2 message, but unlike the ARP request message, it is a unicast message addressed only to the requesting node and not a broadcast message. The ARP reply message contains the MAC address that is the answer to the request (the MAC address of the second node in this example). Additionally, the ARP reply includes the IP address for which the address mapping was requested (the IP address of the second node in this example) and also both MAC address and IP address of the node requesting the reply, which addresses are taken from the ARP request message.
e. When the first node receives the ARP reply message and identifies it to be a reply for its ARP request, it retrieves the provided MAC address from the message (the MAC address of the second node in this example).
f. The first node then inserts a new entry into its cached ARP table, the entry linking the MAC and IP addresses of the second node to each other.
g. The first node uses the MAC address from the newly cached entry for addressing the second node. The cached entry is kept in the first node for future communication with the second node.
h. Optionally, the second node may also add an entry to its cached ARP table, the entry linking the MAC and IP addresses of the first node to each other.

The ARP protocol does not include authentication of the ARP reply message, and therefore is vulnerable to a cyber-attack known as ARP Spoofing. In order to understand how such an attack is carried out, an example of a broadcast domain can be described in which the first and second nodes of the above example reside, where the broadcast domain also includes a third node that is already compromised by the attacker. In other words, the third node is under control of the attacker, which can make it behave in ways desirable to the attacker.

When the first node sends out the ARP request message, the message is also received by the third node, as it is a broadcast message. Under the attacker's control, the third node responds to the ARP request before the second node (which is the intended destination of the message) does so. The third node responds to the ARP request with a fake ARP reply message. The fake message is a seemingly valid ARP reply, but with a fake MAC address as an answer. The fake MAC address may be the MAC address of the third node (the node generating the fake message), or the MAC address of another node that is also under the control of the attacker.

When the first node receives the fake reply, it creates an entry in its cached ARP table that associates the IP address of the second node with the fake MAC address. From now on, all communication intended by the first node for the second node will be received by the node having a MAC address equal to the fake MAC address, and not by the second node.

Once ARP Spoofing is successfully employed, it may allow the attacker to intercept data frames on a network, modify the traffic, or stop all traffic to a certain node. Often the attack is used as an opening for other attacks, such as denial-of-service, man-in-the-middle, or session-hijacking attacks. For example, if the second node is a gateway of the broadcast domain, used by the first node when browsing the Internet, the attacker may provide the first node with poisoned web pages that will compromise the first node and bring it under the control of the attacker.

The ARP Spoofing example demonstrates why identifying which nodes share a common broadcast domain is important for a penetration testing system. If the penetration testing system can determine that (i) a first node uses the ARP protocol for finding MAC addresses in its local network, (ii) the first node uses a second node in its local network as a gateway for browsing the Internet, and (iii) there is a third node in the broadcast domain that was already determined to be compromised or already determined to be compromisable during the current penetration testing campaign, then the penetration testing system may correctly conclude that there is a way to compromise the first node.

However, no reliable conclusion can be reached without knowing whether the third node is located in the same broadcast domain as the first node. If the third node is in the same broadcast domain, then ARP Spoofing can be employed by the attacker to direct all communication sent by the first node to the gateway to reach the third node. As the communication includes Internet browsing requests, this can be used in turn to compromise the first node using any known browsing vulnerability. But if the third node is not located in the same broadcast domain as the first node (and there is no other node in the first node's broadcast domain that is already compromised or already known to be compromisable by the attacker), then no ARP Spoofing is possible and consequently no browsing vulnerability can be used against the first node.

Therefore, it is advantageous for a penetration testing system to have a way of finding out which network nodes share a common broadcast domain.

It should be emphasized that the ARP protocol example described above is only one example, and similar examples can be provided for other protocols such as LLMNR (Link-Local Multicast Name Resolution) or NBNS (NetBIOS over TCP/IP Name service). The common denominator for all the above protocols is that they all provide address translation or host name resolution services and operate within a common broadcast domain. However, the problem is not limited to such network protocols and there are other protocols that are similarly vulnerable to hacking by a false reply. By hacking any of those protocols using a false reply message an attacker can redirect network traffic to reach an incorrect destination, and then use this achievement for compromising one or more network nodes of the same broadcast domain.

It should be emphasized that the above problem is relevant to all kinds of penetration testing systems—actual attack penetration testing systems, simulated penetration testing systems or reconnaissance agent penetration testing systems (see the corresponding definitions in the Definitions section). Obviously, it is relevant when validation of vulnerabilities is achieved by simulation or evaluation, as the evaluation of the applicability of such vulnerability requires knowing whether there is an already compromised node in the broadcast domain under discussion. But even when validation of vulnerabilities is achieved by actual attack of the tested networked system, the problem is still relevant, as without accurately knowing the broadcast domain mapping of the nodes the test might waste much time because of attempting to conduct many unsuccessful attacks.

Prior Art Solutions

The following naïve solution to the above problem is known in the prior art.

Large organizational networks are typically composed of multiple sub-networks, where each sub-network corresponds to a specific portion of the organizational network. Typically, a sub-network corresponds to some physical portion of the organizational network. For example, each floor in a building may be assigned its own sub-network. The individual sub-networks are combined into the full organizational network by level-3 devices such as routers. Consequently, each sub-network becomes a separate broadcast domain.

Each sub-network has its own prefix, which comprises the most significant bits of all the IP addresses that are available for network nodes within the sub-network. Appending 0-bits to the prefix until it reaches the length of an IP address, results in the sub-network ID. For example, a sub-network of an IPv4 network may have a network prefix of 192.168.1.0/24. This means the left-most 24 bits of the specified address (192.168.1 or 11000000.10101000.00000001 in binary notation) are the prefix for the IP addresses of all member nodes. This sub-network has an ID of 192.168.1.0 (11000000.10101000.00000001.00000000), which is the lowest IP address a member node may have.

One can obtain the ID of a sub-network from the IP address of any of its member nodes by ANDing the IP address of the node with the sub-network mask, which is a sequence of 1-bits having the same length as the prefix, followed a sequence of 0-bits that brings the length of the mask to the length of an IP address. For the above example, the sub-network mask is 255.255.255.0 (11111111.11111111.11111111.00000000). Starting from an IP address of 192.168.1.105 (11000000.10101000.00000001.01101001) and ANDing it with the mask, one gets 192.168.1.0 (11000000.10101000.00000001.00000000) as the sub-network ID.

It can be seen, that for every member node of a given sub-network, the result of computing the sub-network ID by the ANDing of the corresponding IP address and the sub-network mask results in the same ID. With the network architecture described above, each sub-network corresponds to a separate broadcast domain, and each broadcast domain corresponds to a separate sub-network. Therefore, it seems that it is possible to determine whether two given network nodes share a common broadcast domain by generating the sub-network ID for both nodes and checking whether the two IDs are equal.

However, there are certain circumstances in which the above naïve solution either is not applicable or does not produce correct results:

A. Two sub-networks that do not share a broadcast domain might nevertheless include overlapping IP addresses. This might happen, for example, when two organizations, each having a sub-network with local IP addresses in the same range, merge into a larger common organization. Instead of going into the trouble of changing IP addresses for one of the sub-networks, an administrator may decide to keep all the existing addresses and avoid conflicts by using NAT (Network Address Translation) for translating IP addresses on the fly.

Applying the naïve solution in such case might result in concluding that a node from the first sub-network and a node from the second sub-network share a common broadcast domain, even though this is not the case.

B. A network node may not have an IP address at all. This might happen, for example, when a dedicated server (e.g. a database server) provides high-bandwidth services to one or more other network nodes using a dedicated fast layer-2 protocol. Lacking an IP address, the naïve solution cannot even be applied in this case. However, in spite of not using level-3 IP addressing, the communication channels of such dedicated server might still be used for compromising its client nodes which do have IP addresses when connecting to the rest of the network.

C. An organizational network might not follow the assumptions described above. For example, one floor which originally was a single broadcast domain may later be split into two separate broadcast domains (without changing IP addresses) by adding a router between two portions of the floor, in order to improve performance when the number of member nodes gets too high. Applying the naïve solution in such case might result in concluding that the floor still constitutes a single broadcast domain, even though this is no longer the case.

The root reason the naïve solution cannot be satisfactory is that we want to find out information at layer 2 of the network, as broadcast domains are inherently layer 2 concepts. However, the naïve solution attempts to achieve the goal using IP addresses, which are inherently level-3 concepts.

Another solution known in the prior art is one in which network nodes exchange dedicated messages between them from which it is possible to deduce whether the communicating nodes share a common broadcast domain or not. By "dedicated" it is meant that the sole purpose of sending such messages is for determining broadcast domain connectivity. However, while such solution may work correctly, it is highly undesirable for penetration testing. The solution might cause two network nodes that under normal conditions never communicate with each other to start communicating, thus triggering alarms by security applications in the networked system.

Therefore, it is desired to have a better solution that allows to reliably determine whether two nodes share a common broadcast domain or not.

SUMMARY

A method for executing a computer-implemented penetration test of a networked system by a penetration testing system, so as to determine a method by which an attacker could compromise the networked system, according to embodiments of the present invention, is disclosed. The penetration testing system comprises (A) a penetration testing software module installed on a remote computing device and (B) a reconnaissance agent software module installed on at least a first network node and a second network node of the networked system. The method for executing the computer-implemented penetration test comprises: (a) receiving, by the penetration testing software module and from the first network node, first information about a first data packet, the first data packet being one member of the group consisting of (i) a data packet received by the first network node from another network node sharing a common broadcast domain with the first network node, and (ii) a data packet sent by the first network node only to one or more other network nodes sharing a common broadcast domain with the first network node, wherein execution of computer code of the reconnaissance agent software module by one or more processors of the first network node causes the one or more processors of the first network node to send the first information; (b) receiving, by the penetration testing software module and from the second network node, second information about a second data packet, the second data packet being one member of the group consisting of (i) a data packet received by the second network node from another network node sharing a common broadcast domain with the second network node, and (ii) a data packet sent by the second network node only to one or more other network nodes sharing a common broadcast domain with the second network node, wherein execution of computer code of the reconnaissance agent software module by one or more processors of the second network node causes the one or more processors of the second network node to send the second information; (c) checking, by the penetration testing software module, whether the first information and the second information satisfy a matching condition; and (d) in response to a determination by the checking that the first information and the second information satisfy a matching condition, carrying out the following steps: (i) concluding, by the penetration testing software module, that the first data packet and the second data packet are a same data packet, and that the first network node and the second network node share a common broadcast domain, and (ii) determining, by the penetration testing software module, the method by which the attacker could compromise the networked system, wherein the method by which the attacker could compromise includes a step that depends on the first network node and the second network node sharing the common broadcast domain. The method additionally comprises: (e) reporting, by the penetration testing software module, the method by which the attacker could compromise the networked system, wherein the reporting comprises at least one member of the group consisting of (i) causing a display device to display a report including information about the determined method by which the attacker could compromise the networked system, (ii) recording the report including the information about the determined method by which the attacker could compromise the networked system in a file, and (iii) electronically transmitting the report including the information about the determined method by which the attacker could compromise the networked system.

In some embodiments, the first data packet can be an ARP data packet. In some embodiments, the first data packet can be an LLMNR data packet. In some embodiments, the first data packet can be an NBNS data packet.

In some embodiments, the first data packet can be an IP data packet including an IP destination address that is an IP broadcast address. The IP broadcast address can be an IPv4 address that is an all-ones address.

In some embodiments, the first data packet can be an IP data packet including an IP destination address that is a link-local address. The link-local address can be an IPv4 address that has a prefix of 169.254. The link-local address can be an IPv6 address that is in the address block fe80::/10.

In some embodiments, it can be that (i) the first information includes a first indication that indicates whether the first data packet is an inbound or an outbound data packet, (ii) the second information includes a second indication that indicates whether the second data packet is an inbound or an outbound data packet, and (iii) a necessary condition for the first information and the second information to satisfy the matching condition is that the first indication is different from the second indication.

In some embodiments, it can be that the first information includes a value of a given field in the first data packet, (ii) the second information includes a value of the given field in the second data packet, and (iii) a necessary condition for the first information and the second information to satisfy the matching condition is that the value of the given field in the first data packet equals the value of the given field in the second data packet. The given field can be an IP address field. The given field can be a MAC address field. The given field can be a protocol type field.

In some embodiments, it can be that (i) the first information includes respective values of multiple given fields in the first data packet, (ii) the second information includes respective values of the multiple given fields in the second data packet, and (iii) a necessary condition for the first information and the second information to satisfy the matching condition is that for each specific given field of the multiple given fields, the respective value in the first data packet equals the respective value in the second data packet. The multiple given fields can include an IP address field and a MAC address field.

In some embodiments, it can be that (i) the first information includes a first result of a first computation based on corresponding values of one or more given fields in the first data packet, (ii) the second information includes a second result of a second computation based on corresponding values of the one or more given fields in the second data packet, and (iii) a necessary condition for the first information and the second information to satisfy the matching condition is that the first result equals the second result. The first computation can be a computation of a hash function. The first computation can be a computation of a XOR function.

In some embodiments, it can be that a necessary condition for the first information and the second information to satisfy the matching condition is that the absolute value of the difference in time between the receiving of the first information and the receiving of the second information is lower than a given threshold.

In some embodiments, it can be that a necessary condition for the first information and the second information to satisfy the matching condition is that the absolute value of the difference between a first time stamp included in the first information and a second time stamp included in the second information is lower than a given threshold.

In some embodiments, the method for executing the computer-implemented penetration test can further comprise: (f) receiving, by the penetration testing software module and from the first network node, third information about a third data packet of the first network node, the third data packet being one member of the group consisting of (i) a data packet received by the first network node from another network node sharing a common broadcast domain with the first network node, and (ii) a data packet sent by the first network node only to one or more other network nodes sharing a common broadcast domain with the first network node, wherein execution of computer code of the reconnaissance agent software module by the one or more processors of the first network node causes the one or more processors of the first network node to send the third information; (g) receiving, by the penetration testing software module and from the second network node, fourth information about a fourth data packet of the second network node, the fourth data packet being one member of the group consisting of (i) a data packet received by the second network node from another network node sharing a common broadcast domain with the second network node, and (ii) a data packet sent by the second network node only to one or more other network nodes sharing a common broadcast domain with the second network node, wherein execution of computer code of the reconnaissance agent software module by the one or more processors of the second network node causes the one or more processors of the second network node to send the second information; and (h) further checking, by the penetration testing software module, whether the third information and the fourth information satisfy the matching condition, wherein the concluding is performed in response to occurrence of both (A) a determination by the checking that the first information and the second information satisfy the matching condition and (B) a determination by the further checking that the third information and the fourth information satisfy the matching condition.

A system for executing a computer-implemented penetration test of a networked system so as to determine a method by which an attacker could compromise the networked system, according to embodiments of the present invention, is disclosed herein. The networked system comprises a plurality of network nodes interconnected by one or more networks. The system for executing the computer-implemented penetration test comprises: (a) a first reconnaissance-agent non-transitory computer-readable storage medium for storage of instructions for execution by one or more processors of a first network node, the first network node being in electronic communication with a remote computing device, the first reconnaissance-agent non-transitory computer-readable storage medium having stored therein first instructions, that when executed by the one or more processors of the first network node, cause the one or more processors of the first network node to send, to the remote computing device, first information about a first data packet, the first data packet being one member of the group consisting of (i) a data packet received by the first network node from another network node sharing a common broadcast domain with the first network node, and (ii) a data packet sent by the first network node only to one or more other network nodes sharing a common broadcast domain with the first network node; (b) a second reconnaissance-agent non-transitory computer-readable storage medium for storage of instructions for execution by one or more processors of a second network node, the second network node being in electronic communication with the remote computing device, the second reconnaissance-agent non-transitory computer-readable storage medium having stored therein second instructions, that when executed by the one or more processors of the second network node, cause the one or more processors of the second network node to send, to the remote computing device, second information about a second data packet, the second data packet being one member of the group consisting of (i) a data packet received by the second network node from another network node sharing a common broadcast domain with the second network node, and (ii) a data packet sent by the second network node only to one or more other network nodes sharing a common broadcast domain with the second network node; and (c) a penetration-testing non-transitory computer-readable storage medium for storage of instructions for execution by one or more processors of the remote computing device, the penetration-testing non-transitory computer-readable storage medium having stored therein: (i) third instructions, that when executed by the one or more processors of the remote computing device, cause the one or more processors of the remote computing device to receive, from the first network node, the first information sent by the first network node, (ii) fourth instructions, that when executed by the one or more processors of the remote computing device, cause the one or more processors of the remote computing device to receive, from the second network node, the second information sent by the second network node, (iii) fifth instructions, that when executed by the one or more processors of the remote computing device, cause the one or more processors of the remote computing device to check whether the first information and the second information satisfy a matching condition, and (iv) sixth instructions, that when executed by the one or more processors of the remote computing device, cause the one or more processors of the remote computing device to carry out the following steps (A) and (B) in response to a determination made by executing the fifth instructions that the first information and the second information satisfy a matching condition: (A) concluding that the first data packet and the second data packet are a same data packet, and that the first network node and the second network node share a common broadcast domain, and (B) determining the method by which the attacker could compromise the networked system, wherein the method by which the attacker could compromise includes a step that depends on the first network node and the second network node sharing the common broadcast domain. The penetration-testing non-transitory computer-readable storage medium additionally has stored therein (v) seventh instructions, that when executed by the one or more processors of the remote computing device, cause the one or more processors of the remote computing device to report the determined method by which the attacker could compromise the networked system, wherein the reporting comprises at least one member of the group consisting of (i) causing a display device to display a report including information about the determined method by which the attacker could compromise the networked system, (ii) recording the report including the information about the determined method by which the attacker could compromise the networked system in a file, and (iii) electronically transmitting the report including the information about the determined method by which the attacker could compromise the networked system.

A method for distributing a common set of data to multiple network nodes of a networked system by a data distribution system, according to embodiments of the present invention, is disclosed. The data distribution system comprises (A) a data distribution server software module installed on a data distribution remote computing device and (B) a data distribution agent software module installed on at least a first network node and a second network node of the networked system. The method for distributing the common set of data comprises: (a) receiving, by the data distribution server software module and from the first network node, first information about a first data packet, the first data packet being one member of the group consisting of (i) a data packet received by the first network node from another network node sharing a common broadcast domain with the first network node, and (ii) a data packet sent by the first network node only to one or more other network nodes sharing a common broadcast domain with the first network node, wherein execution of computer code of the data distribution agent software module by one or more processors of the first network node causes the one or more processors of the first network node to send the first information; (b) receiving, by the data distribution server software module and from the second network node, second information about a second data packet of the second network node, the second data packet being one member of the group consisting of (i) a data packet received by the second network node from another network node sharing a common broadcast domain with the second network node, and (ii) a data packet sent by the second network node only to one or more other network nodes sharing a common broadcast domain with the second network node, wherein execution of computer code of the data distribution agent software module by one or more processors of the second network node causes the one or more processors of the second network node to send the second information; (c) checking, by the data distribution server software module, whether the first information and the second information satisfy a matching condition; and (d) in response to a determination by the checking that the first information and the second information satisfy the matching condition, carrying out the following steps: (i) concluding, by the data distribution server software module, that the first data packet and the second data packet are a same data packet, and that the first network node and the second network node share a common broadcast domain; and (ii) delivering the common set of data to multiple network nodes of the common broadcast domain, the delivering comprising: (A) transmitting the common set of data to the first network node, and (B) causing the first network node to transmit the common set of data from the first network node to the second network node.

In some embodiments, the transmitting of the common set of data to the first network node can be performed by the data distribution remote computing device. In some embodiments, the transmitting of the common set of data to the first network node can be performed by a computing device other than the data distribution remote computing device.

In some embodiments, the common set of data can include media data. In some embodiments, the common set of data can include an installation package of a software application.

In some embodiments, the common set of data can include an update for a software application. The update for the software application can be an update for code of the software application. The update for the software application can be an update for data of the software application. The software application can be an anti-virus application and the update for data of the software application can include a threats database or updates thereto.

In some embodiments, the first data packet can be an ARP data packet. In some embodiments, the first data packet can be an LLMNR data packet. In some embodiments, the first data packet can be an NBNS data packet.

In some embodiments, the first data packet can be an IP data packet including an IP destination address that is an IP broadcast address. The IP broadcast address can be an IPv4 address that is an all-ones address.

The first data packet can be an IP data packet including an IP destination address that is a link-local address. The link-local address can be an IPv4 address that has a prefix of 169.254. The link-local address can be an IPv6 address that is in the address block fe80::/10.

In some embodiments, it can be that (i) the first information includes a first indication that indicates whether the first data packet is an inbound or an outbound data packet, (ii) the second information includes a second indication that indicates whether the second data packet is an inbound or an outbound data packet, and (iii) a necessary condition for the first information and the second information to satisfy the matching condition is that the first indication is different from the second indication.

In some embodiments, it can be that (i) the first information includes a value of a given field in the first data packet, (ii) the second information includes a value of the given field in the second data packet, and (iii) a necessary condition for the first information and the second information to satisfy the matching condition is that the value of the given field in the first data packet equals the value of the given field in the second data packet. The given field can be an IP address field. The given field can be MAC address field. The given field can be a protocol type field.

In some embodiments, it can be that (i) the first information includes respective values of multiple given fields in the first data packet, (ii) the second information includes respective values of the multiple given fields of the second data packet, and (iii) a necessary condition for the first information and the second information to satisfy the matching condition is that for each specific given field of the multiple given fields, the respective value in the first data packet equals the respective value in the second data packet. The multiple given fields can include an IP address field and a MAC address field.

In some embodiments, it can be that (i) the first information includes a first result of a first computation based on corresponding values of one or more given fields in the first data packet, (ii) the second information includes a second result of a second computation based on corresponding values of the one or more given fields in the second data packet, and (iii) a necessary condition for the first information and the second information to satisfy the matching condition is that the first result equals the second result. The first computation can be a computation of a hash function. The first computation can be a computation of a XOR function.

In some embodiments, it can be that a necessary condition for the first information and the second information to satisfy the matching condition is that the absolute value of the difference in time between the receiving of the first information and the receiving of the second information is lower than a given threshold.

In some embodiments, it can be that a necessary condition for the first information and the second information to satisfy the matching condition is that the absolute value of the difference between a first time stamp included in the first information and a second time stamp included in the second information is lower than a given threshold.

In some embodiments, the method for distributing a common set of data to multiple network nodes of a networked system by a data distribution system can further comprise: (e) receiving, by the data distribution server software module and from the first network node, third information about a third data packet of the first network node, the third data packet being one member of the group consisting of (i) a data packet received by the first network node from another network node sharing a common broadcast domain with the first network node, and (ii) a data packet sent by the first network node only to one or more other network nodes sharing a common broadcast domain with the first network node, wherein execution of computer code of the data distribution agent software module by the one or more processors of the first network node causes the one or more processors of the first network node to send the third information; (f) receiving, by the data distribution server software module and from the second network node, fourth information about a fourth data packet of the second network node, the fourth data packet being one member of the group consisting of (i) a data packet received by the second network node from another network node sharing a common broadcast domain with the second network node, and (ii) a data packet sent by the second network node only to one or more other network nodes sharing a common broadcast domain with the second network node, wherein execution of computer code of the data distribution agent software module by the one or more processors of the second network node causes the one or more processors of the second network node to send the fourth information; and (g) further checking, by the data distribution server software module, whether the third information and the fourth information satisfy the matching condition, wherein the concluding is performed in response to occurrence of both (A) a determination by the further checking that the third information and the fourth information satisfy the matching condition and (B) a determination by the checking that the first information and the second information satisfy the matching condition.

A data distribution system for distributing a common set of data to multiple network nodes of a networked system, according to embodiments of the present invention, is disclosed herein. The networked system comprises a plurality of network nodes interconnected by one or more networks. The data distribution system comprises: (a) a first distribution-agent non-transitory computer-readable storage medium for storage of instructions for execution by one or more processors of a first network node, the first network node being in electronic communication with a data distribution remote computing device, the first distribution-agent non-transitory computer-readable storage medium having stored therein first instructions, that when executed by the one or more processors of the first network node, cause the one or more processors of the first network node to send, to the data distribution remote computing device, first information about a first data packet, the first data packet being one member of the group consisting of (i) a data packet received by the first network node from another network node sharing a common broadcast domain with the first network node, and (ii) a data packet sent by the first network node only to one or more other network nodes sharing a common broadcast domain with the first network node; (b) a second reconnaissance-agent non-transitory computer-readable storage medium for storage of instructions for execution by one or more processors of a second network node, the second network node being in electronic communication with the data distribution remote computing device, the second reconnaissance-agent non-transitory computer-readable storage medium having stored therein second instructions, that when executed by the one or more processors of the second network node, cause the one or more processors of the second network node to send, to the data distribution remote computing device, second information about a second data packet of the second network node, the second data packet being one member of the group consisting of (i) a data packet received by the second network node from another network node sharing a common broadcast domain with the second network node, and (ii) a data packet sent by the second network node only to one or more other network nodes sharing a common broadcast domain with the second network node; (c) a distribution-server non-transitory computer-readable storage medium for storage of instructions for execution by one or more processors of the data distribution remote computing device, the distribution-server non-transitory computer-readable storage medium having stored therein: (i) third instructions, that when executed by the one or more processors of the data distribution remote computing device, cause the one or more processors of the data distribution remote computing device to receive, from the first network node, the first information sent by the first network node, (ii) fourth instructions, that when executed by the one or more processors of the data distribution remote computing device, cause the one or more processors of the data distribution remote computing device to receive, from the second network node, the second information sent by the second network node, (iii) fifth instructions, that when executed by the one or more processors of the data distribution remote computing device, cause the one or more processors of the data distribution remote computing device to check whether the first information and the second information satisfy a matching condition, and (iv) sixth instructions, that when executed by the one or more processors of the data distribution remote computing device, cause the one or more processors of the data distribution remote computing device to carry out the following steps (A) and (B) in response to a determination made by executing the fifth instructions that the first information and the second information satisfy a matching condition: (A) concluding that the first data packet and the second data packet are a same data packet, and that the first network node and the second network node share a common broadcast domain, and (B) delivering the common set of data to multiple network nodes of the common broadcast domain, the delivering comprising: (I) transmitting the common set of data to the first network node, and (II) causing the first network node to transmit the common set of data from the first network node to the second network node.

BRIEF DESCRIPTION OF THE DRAWINGS

FIGS. 5 and 6 show respective flowcharts of methods for executing a computer-implemented penetration test of a networked system by a penetration testing system so as to determine a method by which an attacker could compromise the networked system, according to embodiments.

FIG. 7C shows a block diagram of a non-transitory computer-readable storage medium installed at the remote computing device of FIG. 4, comprising groups of program instructions, according to embodiments.

FIGS. 9 and 10 show respective flowcharts of methods for distributing a common set of data to multiple network nodes of a networked system by a data distribution system, according to embodiments.

DETAILED DESCRIPTION OF THE EMBODIMENTS

Note: Throughout this disclosure, subscripted reference numbers (e.g., $101_1$) or letter-modified reference numbers (e.g., $100a$) may be used to designate multiple separate appearances of elements in a single drawing, e.g. $101_1$ is a single appearance (out of a plurality of appearances) of element 10, and likewise $100a$ is a single appearance (out of a plurality of appearances) of element 100.

It can be advantageous to find out whether a first network node in a networked system receives messages that are guaranteed to be sent from a second network node in its local broadcast domain (e.g. broadcast messages). In some embodiments this determination can be used in determining a method by which an attacker could compromise the networked system. In other embodiments this determination can be used in facilitating the distribution of a common set of data to multiple network nodes of a networked system.

In order to achieve this goal, a local agent installed on each network node monitors incoming and outgoing network messages. The agent looks for messages that can be determined to be broadcast messages or that can be otherwise determined to come from the local broadcast domain. For example, any ARP request message is known to be a broadcast message, as ARP requests are always broadcasted. As another example, any IPv4 message addressed to 255.255.255.255 (the all-ones IP address) is known to be a broadcast message, as this special address stands for "all of this local sub-network". As still another example, any IPv4 message addressed to an address with a prefix of 169.254 is known to be "a local subnetwork" message, as this special range is set-aside for that purpose. The same is true for IPv6 addresses within the block fe80::/10.

Figure 1:
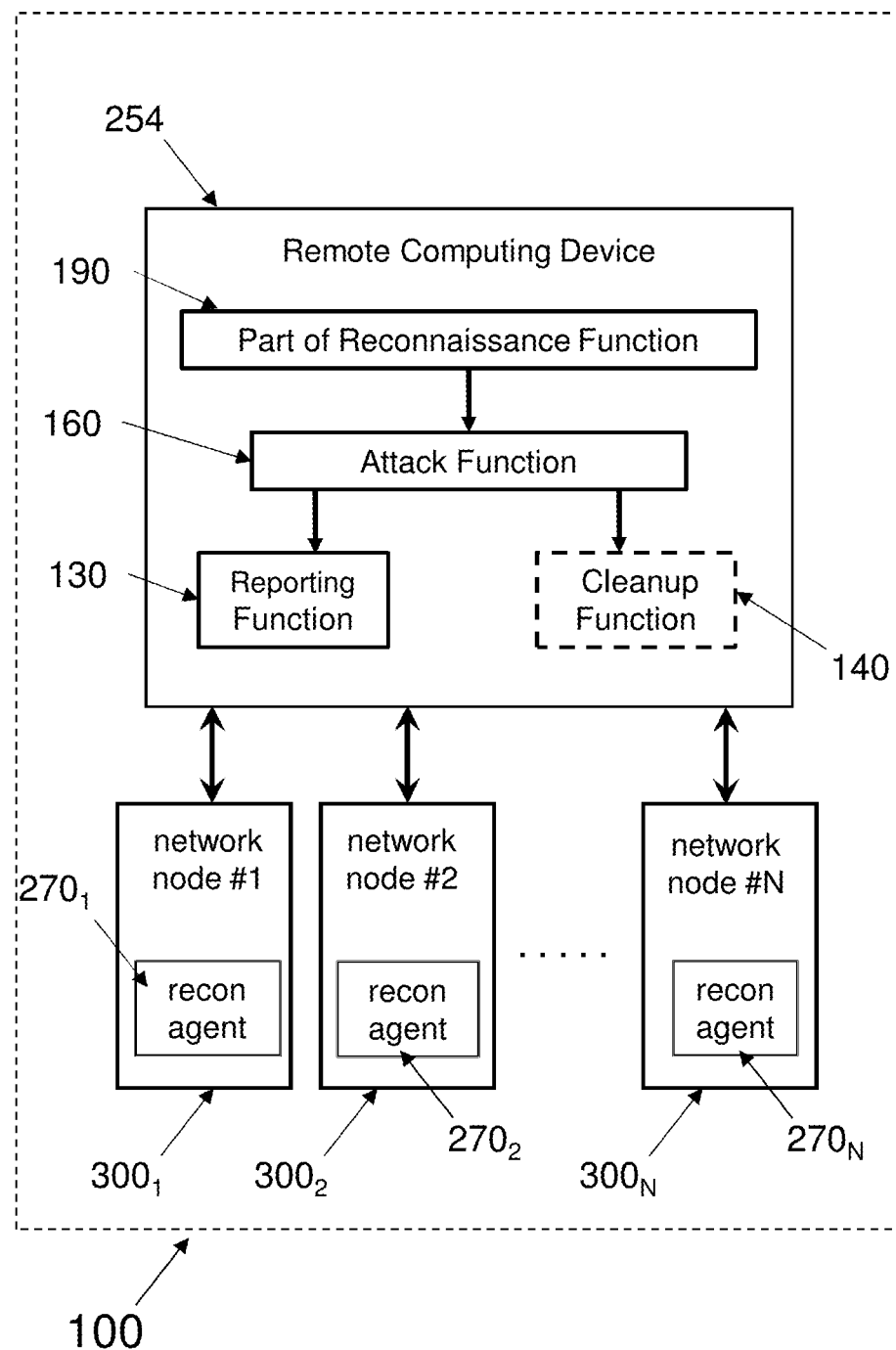
FIG. 1 shows a is a functional block diagram of a reconnaissance agent penetration testing system according to some embodiments.

FIG. 1 shows the architecture of a network penetration testing system that uses local agents installed on multiple network nodes of the tested networked system. The figure shows a functional block diagram of a penetration testing system 100 according to some embodiments, comprising a reconnaissance function as defined as definition "14" in the Definitions Section later in this specification. The reconnaissance function includes functionality implemented in reconnaissance agents 270 ($270_1$, $270_2$, ... $270_N$) installed in respective network nodes 300 ($300_1$, $300_2$, ... $300_N$) and, in some embodiments, also includes functionality in a remote computing device 254 in which is implemented "part of reconnaissance function" 190. In some embodiments, an attack function 160, as defined by definition "15" in the Definitions Section, a reporting function 130 as defined by definition "16" in the Definitions Section, and optionally a recovery function 140 (also known in the industry as a 'clean-up' function and synonymous therewith), as defined by definition "17" in the Definitions Section, are all implemented in the remote computing device 254. As explained in definition "15", an 'attack function' forms part of the architecture of every penetration testing system and performs the function of determining whether one or more security vulnerabilities exist in the tested networked system.

In some embodiments, a reconnaissance agent software module ("RASM") is installed in one or more network nodes of a tested networked system. Installed in a network node, the reconnaissance agent detects data packets sent by the node or received by the node, and sends information about the detected data packets to the remote computing device 254 where a penetration testing software module (PTSM) is installed.

Figure 2:
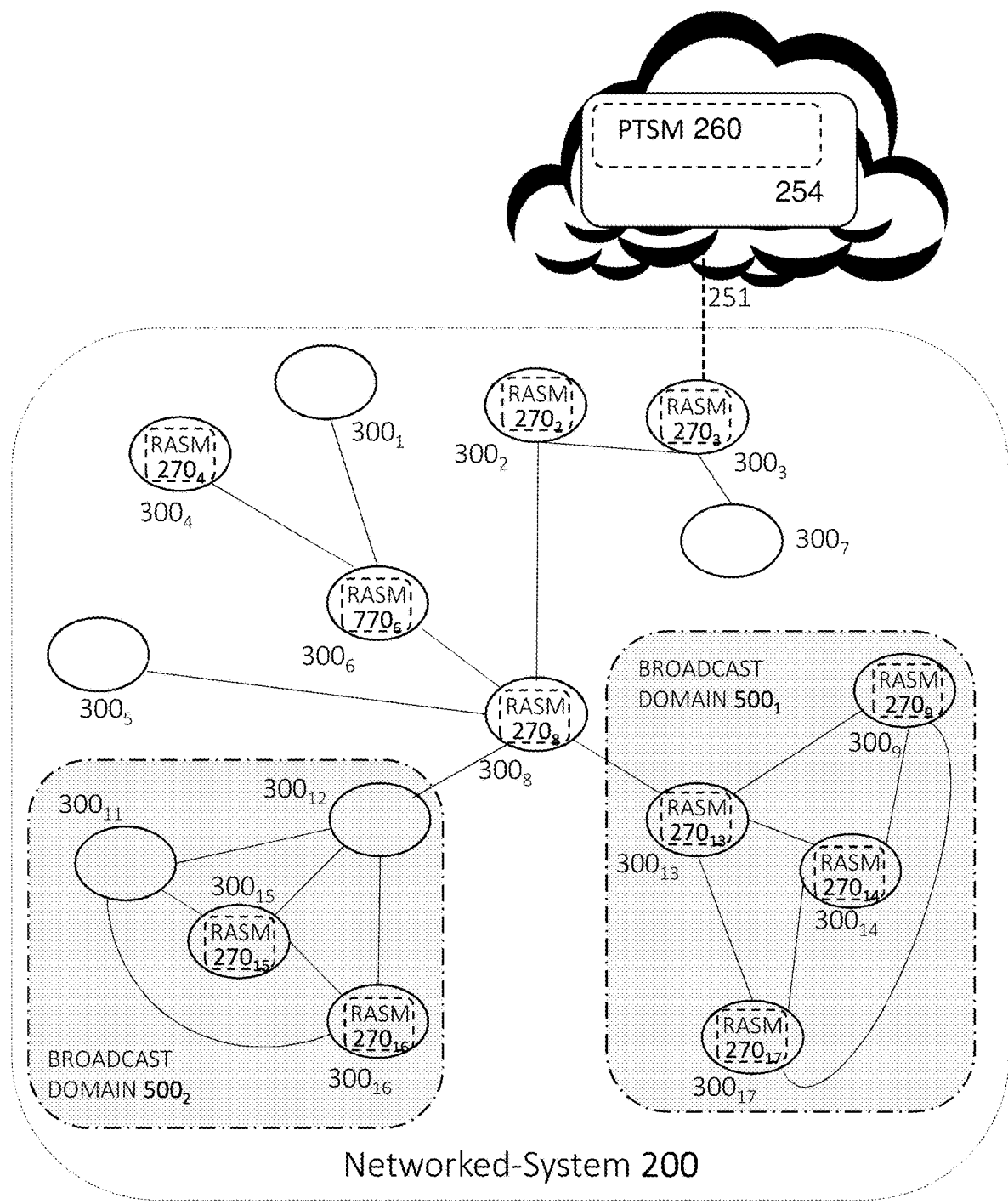
FIG. 2 shows a schematic illustration of a networked system comprising multiple network nodes, some of which have a reconnaissance agent software module installed therein, and a remote computing device in the cloud, having a penetration testing software module installed therein and in connection with the networked system, according to embodiments.

Referring now to FIG. 2, an example of arrangements for implementing penetration testing is illustrated schematically in accordance with embodiments of the invention. A penetration testing system comprising a penetration testing software module (PTSM) 260 is installed on a remote computing device 254 and a reconnaissance agent software module (RASM) 270 is installed on at least some of a plurality of network nodes 300 of a networked system 200.

The number of network nodes 300 can be as few as two and as many as several thousands or several tens of thousands. They can be connected hierarchically, peer-to-peer, hub-and-spoke, or in any combination of connections as long as each networked node 300 is connected to at least one other node 300.

In the example of FIG. 2, the remote computing device 254 on which the PTSM 260 is installed is external to the networked system 200 and is in communication with the networked system 200 by an Internet connection 251, although in some embodiments the communication may be by a local-area network (LAN) connection (not shown). In this case, the physical location of remote computing device 254 is unimportant. It can be, by way of non-limiting examples, at a physical location belonging to a supplier or operator of a penetration testing system, in a 'cloud' server farm of an Internet services or cloud services provider as shown in FIG. 2, or it can be physically co-located with some or all of the network nodes 300. In other embodiments, which are not shown, the remote computing device on which the PTSM is installed may be internal to the networked system 200, for example when executed by a virtual machine residing in one of the network nodes 300.

As can be seen in FIG. 2, the networked system 200 can include subnetworks of nodes 300 in which nodes 300 share a common broadcast domain 500—for example, nodes $300_9$, $300_{13}$, $300_{14}$, and $300_{17}$ share the common broadcast domain $500_1$. Each node in the broadcast domain $500_1$ can directly communicate with every other node of the domain.

As will be discussed below, in embodiments of the invention, PTSM 260 and at least two instances of RASM 270 in two respective network nodes 300 cooperate to collectively subject the networked system 200 to penetration testing that identifies communicating network nodes sharing a common broadcast domain in order to determine methods by which the networked system 200 can be compromised.

In some embodiments, a data distribution agent software module ("DDASM") is installed in one or more network nodes of a networked system. Installed in a network node, the data distribution agent detects data packets sent by the node or received by the node, and sends information about the detected data packets to the remote computing device 754 where a data distribution server software module (DDSSM) is installed.

Figure 3:
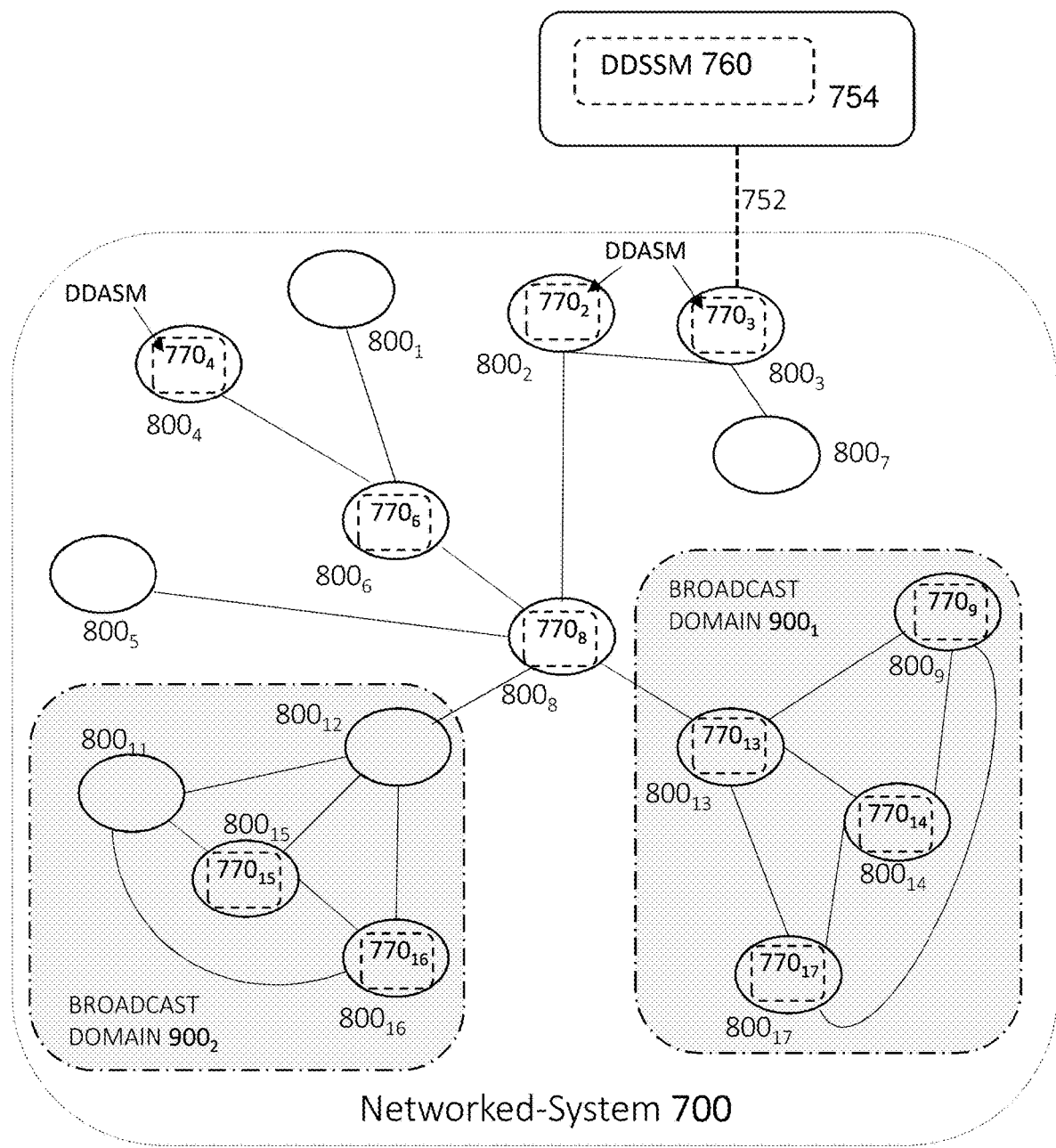
FIG. 3 shows a schematic illustration of a networked system comprising multiple network nodes, some of which have a data distribution agent software module installed therein, and a data distribution remote computing device located locally, having a data distribution server software module installed therein and in connection with the networked system, according to embodiments.

Referring now to FIG. 3, an example of arrangements for facilitating the proliferation, i.e., transmission, of sets of data through a network is illustrated schematically in accordance with embodiments of the invention. A data distribution system comprises a data distribution server software module (DDSSM) 760 installed on a remote computing device 754 and a data distribution agent software module (DDASM) 770 installed on at least some of a plurality of network nodes 800 of a networked system 700.

The number of network nodes 800 can be as few as two and as many as several thousands or several tens of thousands. They can be connected hierarchically, peer-to-peer, hub-and-spoke, or in any combination of connections as long as each networked node 800 is connected to at least one other node 800.

In the example of FIG. 3, the remote computing device 754 on which the DDSSM 760 is installed is external to the networked system 700 and is in communication with the networked system 700 by a local-area network (LAN) connection 752, although in some embodiments the communication may be by an Internet connection (not shown). In this case, the physical location of remote computing device 754 is unimportant. It can be, by way of non-limiting examples, at a physical location belonging to a supplier or operator of a data distribution system, in a 'cloud' server farm of an Internet services or cloud services provider, or it can be physically co-located with some or all of the network nodes 800. In other embodiments, which are not shown, the remote computing device on which the DDSSM is installed may be internal to the networked system 700, for example when executed by a virtual machine residing in one of the network nodes 800.

As can be seen in FIG. 3, the networked system 700 can include subnetworks of nodes 800 in which nodes 800 share a common broadcast domain 900—for example, nodes $800_9$, $800_{13}$, $800_{14}$, and $800_{17}$ share the common broadcast domain $900_1$. Each node in the broadcast domain $900_1$ can directly communicate with every other node of the domain.

As will be discussed below, in embodiments of the invention, DDSSM 760 and at least two instances of DDASM 770 in two respective network nodes 800 cooperate to collectively identify communicating network nodes sharing a common broadcast domain in order to facilitate data distribution to nodes 800 of the networked system 700.

Once a broadcast or local subnetwork message (whether incoming or outgoing) is detected by the local agent installed in a given node, it sends a reporting message to the remote computing device that serves as a central server for the purpose of an exemplary embodiment. The reporting message can include the following:

a. A Boolean flag indicating whether the detected broadcast message (which is the subject of the reporting message) was received by the reporting node or was sent by the reporting node.

b. The IP address of the sender, as extracted from the detected broadcast message. For example, if the detected broadcast message is an ARP request message, then the sender's IP address is taken from the SPA (Sender Protocol Address) field. As another example, if the detected broadcast message is an IP broadcast message, the sender's IP address is taken from the Source IP Address field.

c. The MAC address of the sender, as extracted from the detected broadcast message. For example, if the detected broadcast message is an ARP request message, then the sender's MAC address is taken from the SHA (Sender Hardware Address) field. As another example, if the detected broadcast message is an IP broadcast message, the sender's MAC address is taken from the sender address field of the layer 2 message carrying the level 3 IP broadcast message.

d. The protocol of the message.

e. Time of sending/receiving the detected broadcast message.

Additional fields may be reported (at least for certain message protocols), in order to increase the reliability of the matching of reports. Also, fewer fields may be reported (e.g. not reporting the IP address), in order to reduce the required processing or because such fields are not relevant to the message protocol.

On top of the above fields, each report includes a unique identifier of the reporting agent that enables the remote computing device to identify the node from which the report is sent. The unique identifier may be a unique agent ID number associated with the instance of the agent at the time it was installed in its hosting node or a unique ID number of the hosting node.

The remote server to which all the reporting messages are addressed tries to find matching reports. As an example, two reporting messages may be declared to match each other if all of the following conditions are satisfied:

1. The two reporting messages are received from different network nodes.

2. One of the two reporting messages indicates a sent local sub-network message, while the other indicates a received local sub-network message.

3. The sender IP address in both reporting messages is the same.

4. The sender MAC address in both reporting messages is the same.

5. The absolute value of the difference between the reported time values of the two reporting messages is smaller than a specific value.

If all the above conditions are satisfied, then we determine that there is a high probability that the two reporting messages refer to the same sub-network message. We can thus conclude that broadcasting and other local-network communication is possible between the two network nodes providing the matched reporting messages, and consequently we can conclude those two network nodes share a common broadcast domain.

The above matching algorithm is only an example. The matching condition may use only some of the reported fields or may require matching additional fields that are not listed in the above example.

In some embodiments, the size of the reports is reduced by sending to the remote server a result of a computation that is based on the reported message data instead of sending the actual reported message data. The computation may be a hash function such as a XOR function, a SHA1 function or an MD5 function. For example, instead of sending both the IP address and the MAC address, we can send the result of the computation (IP Address) XOR (MAC address). The matching is then done between the computation results in the two reports.

In some embodiments, timing data is not sent in the reports (unlike the above example), and instead one may use the time of receiving the reports in the remote server as the time to use for determining a match between reports.

Even though the evidence thus collected only proves that one node (the one reporting sending the sub-network message) is able to broadcast to another node (the one reporting receiving the sub-network message), we may sometimes conclude that each of the two nodes can broadcast to the other, as broadcasting within a broadcast domain is usually a symmetric capability—if node A can broadcast to node B, then node B can also broadcast to node A. However, there are networked systems that employ layer-2 firewalls, which make the symmetric rule not always true. Therefore, in some embodiments, it can be preferable to use the symmetric rule for optimizing and speeding up the implementation of the determination of which network nodes share broadcast domains, but not for reaching a firm conclusion.

Consequently, for a higher standard of proof, it is possible to limit the declaring of two nodes A and B as sharing a common broadcast domain only to cases in which the server detects both a first broadcast message sent from node A to node B and a second broadcast message sent from node B to node A. Similarly, for even a higher standard of proof, it is possible to limit the declaring of two nodes A and B as sharing a common broadcast domain only to cases in which the server detects two broadcast messages sent between them in each direction.

The above procedure of reporting broadcast messages to the server from all network nodes of the tested networked system may create excessive load for the network and the nodes. Therefore, some "filtering" of reporting messages can be applied for reducing load. For example, an agent, e.g., a RASM or DDASM, can record what reporting messages it had sent during a recent time interval (e.g. during the last 30 minutes), and if a newly detected broadcast message would result in reporting a sender IP address that was already reported during the recent time interval, the reporting is skipped. Alternatively, if a newly detected broadcast message would result in reporting a sender MAC address that was already reported during the recent time interval, the reporting is skipped. Alternatively, if a newly detected broadcast message would result in reporting both a sender IP address and a sender MAC address that were already reported (in the same report) during the recent time interval, the reporting is skipped.

In order to correctly handle dynamic changes in the networked system structure (e.g. when a user moves his laptop computer from one physical location to another physical location), the remote server software module, e.g., a PTSM or DDSSM, may apply a "freshness" factor to its conclusions. For example, one may decide that in order to consider two nodes to be sharing a common broadcast domain, evidence to that effect (obtained by matching two reporting messages reported by those two nodes) must be obtained within the last two hours. Any older evidence would be considered obsolete and not taken into account.

The remote server software module can further enhance its ability to construct the broadcast-domain-mapping of the networked system by relying on the transitivity of the relation of sharing a common broadcast domain. If it is determined that (i) nodes A and B share a common broadcast domain, (ii) nodes B and C share a common broadcast domain, and (iii) both connections used the same network interface on node B, then it is safe to conclude that also nodes A and C share a common broadcast domain.

Penetration Testing

The disclosed embodiments allow a penetration testing system to determine whether some security vulnerabilities exist in the tested networked system and might be exploited by an attacker.

The following sequence of events may occur:

A. A penetration testing campaign determines that node B of the tested networked system can be compromised by some method of attack.

B. Node A reports to the penetration testing software module that an ARP request message was sent out of node A.

C. Node B reports to the penetration testing software module that an ARP request message was received in node B.

D. Node C reports to the penetration testing software module that an ARP request message was received in node C.

E. The penetration testing software module finds a match between the report of node A and the report of node B, concluding that nodes A and B share a common broadcast domain.

F. The penetration testing software module finds a match between the report of node A and the report of node C, concluding that nodes A and C share a common broadcast domain.

G. Based on the findings that nodes A and B and nodes A and C share a common broadcast domain, the penetration testing software module concludes that nodes B and C also share a common broadcast domain.

H. Node C reports to the penetration testing software module that an ARP request message was sent out of node C.

I. The penetration testing software module determines that node C is vulnerable to an ARP Spoofing attack, because during a real attack, node B (which is already compromised) would receive the ARP request, and would respond with an ARP Spoofing message. This is so because it was determined that nodes B and C share a common broadcast domain.

Note that in the alternative case in which event H is— "Node B reports to the remote computing device that an ARP request message was received from node C", the above determination in event I would also be correct.

Once the members of a broadcast domain are determined by matching pairs of messages, it is no longer required to match a pair of messages in order to conclude there is an opportunity to compromise a member node. This is one reason why in Event H it is enough to rely on only one report about the ARP request message sent by Node C (either the report sent by node C or the report sent by node B). Therefore, once the broadcast connection between two nodes is determined, it can be desirable to save reporting messages by guiding each of the two agents installed on the two nodes not to report "risky" messages that create opportunities for attack (e.g. ARP requests) received from the other "neighbor" node, but only report such messages when sent by the network node hosting the agent. The single report about sending the risky message can be used by the remote server to conclude, based on knowing that the sending node shares a broadcast domain with a node that is already known to be compromisable, that the sending node could also be compromised.

in the above sequence of events it is possible to give up the reporting by the sending node (node A) in event B because events C and D (receiving of the ARP request) already tell us that the sending node (node A) and the two receiving nodes (nodes B and C) share a common broadcast domain, without requiring matching of messages. This is indeed a possibility, but with this variation of the method the remote server will indeed be able to determine there is some node that shares a common broadcast domain with nodes B and C, but will not be able to determine which node is it.

Even though the reports from nodes B and C include the IP address and the MAC address of node A (as they appear in the broadcast message sent by A), this is not enough for the remote server to uniquely determine which node is this. The reason is that in a typical large organization neither the MAC address nor the IP address uniquely identifies a network node. While MAC addresses must be unique within a broadcast domain, they need not be unique within the full network. This is very common when many nodes are virtual nodes that have no physical network adaptor of their own, but might also be the case even with physical nodes that are located in different subnetworks of the full network. Similarly, IP addresses are also not always unique, as was already explained in a previous section.

A method based on matching a pair of messages does not suffer from the above problem. The matching of a pair of reports provides the unique identification number of each of the reporting agents, which enables the remote server to uniquely determine the nodes from which the reports were received.

The scenario presented above uses only received data packets that are known to be received from network nodes in the local broadcast domain. However, a layer 3 data packet received from a remote node through the mediation of a local node of the local broadcast domain physically reaches the receiving network node embedded in a layer 2 message sent by the local mediating node. Such layer 2 message includes the local link address (e.g. MAC address) of the mediating node. In other words, any data packet received through the local broadcast domain (even if composed and sent by a remote network node) provides information about the identity of the last local node it passed through before reaching its final destination. Therefore, the method as disclosed above can be extended to also use data packets sent by remote network nodes for enhancing the determination of members of the local broadcast domain.

Figure 4:
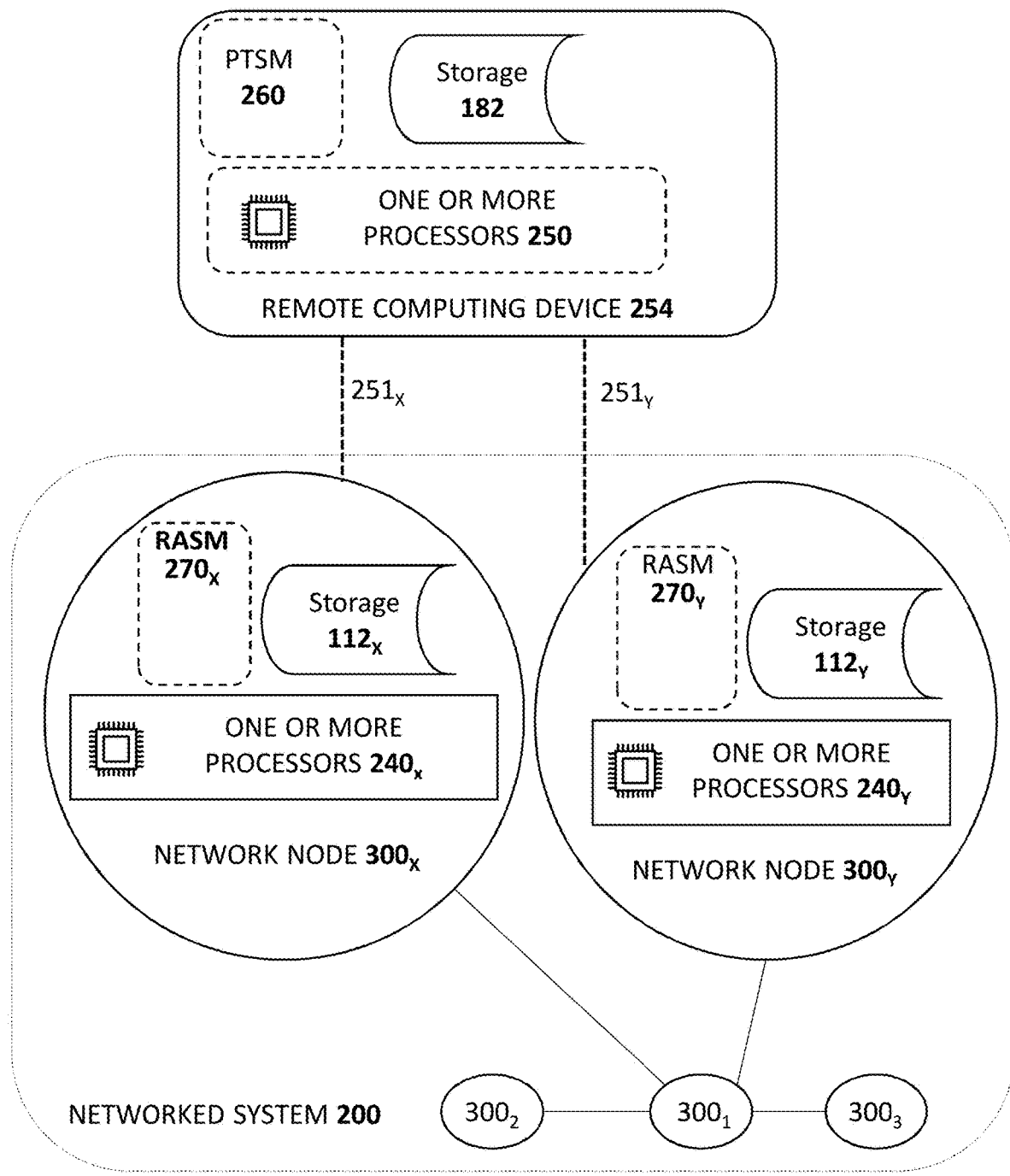
FIG. 4 shows a block diagram of a networked system having first and second network nodes each of which has a reconnaissance agent software module installed therein, and a remote computing device having a penetration testing software module installed therein and in connection with the networked system, according to embodiments.

We now refer to FIG. 4. A system, for executing a computer-implemented penetration test of a networked system so as to determine a method by which an attacker could compromise the networked system, is schematically illustrated.

Networked system 200, which can be, for example, the networked system 200 shown in FIG. 2, includes a plurality of network nodes 300. Five nodes 300 ($300_1$, $300_2$, $300_3$, $300_X$ and $300_Y$) are shown, but the networked system 200 can include any number of nodes 300. Reconnaissance agent software modules $270_X$, $270_Y$ are installed in first and second network nodes $300_X$, $300_Y$, respectively. As disclosed earlier, the RASM 270 can be installed in any or all of the network nodes 300.

As illustrated in FIG. 4, a penetration testing system can comprise:

A first reconnaissance-agent non-transitory computer-readable storage medium $112_X$ which is associated with the first node $300_X$. This first storage medium $112_X$ is provided for storage of first instructions $115_X$ of a reconnaissance agent software module instance $270_X$ for execution by one or more processors $240_X$ of the first network node $300_X$, which is in electronic communication with a remote computing device 254 (by communications arrangement $251_X$ which can be an Internet connection or a LAN connection or any other suitable connection, including an indirect connection). A reconnaissance agent software module instance (RASM) $270_X$ is installed in the network node $300_X$. The first storage medium $112_X$ is shown for convenience as being part of the network node $300_X$ but it can be anywhere as long as the one or more processors $240_X$ can access and execute the instructions $115_X$ stored therein.

A second reconnaissance-agent non-transitory computer-readable storage medium $112_Y$ which is associated with the second node $300_Y$. This second storage medium $112_Y$ is provided for storage of instructions $115_Y$ of a reconnaissance agent software module instance $270_Y$ for execution by one or more processors $240_Y$ of the second network node $300_Y$, which is also in electronic communication with the remote computing device 254 (by communications arrangement $251_Y$ which can be the same as communications arrangement $251_X$ or separate and/or different). A reconnaissance agent software module instance $270_Y$ is installed in the network node $300_Y$. The second storage medium $112_Y$ is also shown for convenience as being part of the network node $300_Y$ but it can be anywhere as long as the one or more processors $240_Y$ can access and execute the instructions $115_Y$ stored therein.

A penetration-testing non-transitory computer-readable storage medium 182 for storage of instructions 116 of the penetration testing software module 260 for execution by one or more processors 250 of the remote computing device 254. A penetration testing software module 260 is installed in the remote computing device 254. This storage medium 182 is also shown for convenience as being part of the remote computing device 254 but it can be anywhere as long as the one or more processors 250 can access and execute the instructions 116 stored therein.

Referring now to FIG. 5, a method is disclosed for executing a computer-implemented penetration test of a networked system 200 by a penetration testing system so as to determine a method by which an attacker could compromise the networked system 200. A penetration testing system suitable for carrying out the method comprises (A) a penetration testing software module (PTSM) 260 installed on a remote computing device 254 and (B) a reconnaissance agent software module (RASM) 270 installed on at least a first network node $300_X$ and a second network node $300_Y$ of the networked system. All steps of the method are preferably carried out by the PTSM 260. As illustrated by the flow chart in FIG. 5, the method comprises:

Step S01 Receiving, from the first network node $300_X$, first information about a first data packet, the first data packet being one member of the group consisting of (i) a data packet received by the first network node $300_X$ from another network node 300 sharing a common broadcast domain 500 with the first network node $300_X$, and (ii) a data packet sent by the first network node $300_X$ only to one or more other network nodes 300 sharing a common broadcast domain 500 with the first network node 300$_X$, wherein execution of computer code of the RASM 270$_X$ by one or more processors 240$_X$ of the first network node 300$_X$ causes the one or more processors 240$_X$ of the first network node 300$_X$ to send the first information.

Step S02 Receiving, from the second network node 300$_Y$, second information about a second data packet, the second data packet being one member of the group consisting of (i) a data packet received by the second network node 300$_Y$ from another network node 300 sharing a common broadcast domain 500 with the second network node 300$_Y$, and (ii) a data packet sent by the second network node 300$_Y$ only to one or more other network nodes 300 sharing a common broadcast domain 500 with the second network node 300$_Y$, wherein execution of computer code of the RASM 270$_Y$ by one or more processors 240$_Y$ of the second network node 300$_Y$ causes the one or more processors 240$_Y$ of the second network node 300$_Y$ to send the second information.

Step S03 Checking whether the first information and the second information satisfy a matching condition.

Step S04 In response to a determination by the checking in Step S03 that the first information and the second information satisfy a matching condition, carrying out the following sub-steps:

Sub-step S04-1 Concluding that the first data packet and the second data packet are a same data packet, and that the first network node 300$_X$ and the second network node 300$_Y$ share a common broadcast domain 500, and Sub-Step S04-2 determining the method by which the attacker could compromise the networked system 200, wherein the method by which the attacker could compromise includes a step that depends on the first network node 300$_X$ and the second network node 300$_Y$ sharing the common broadcast domain 500.

Step S05 Reporting the method by which the attacker could compromise the networked system 200, wherein the reporting comprises at least one member of the group consisting of (i) causing a display device to display a report including information about the determined method by which the attacker could compromise the networked system 200, (ii) recording the report including the information about the determined method by which the attacker could compromise the networked system 200 in a file, and (iii) electronically transmitting the report including the information about the determined method by which the attacker could compromise the networked system 200.

Figure 6:
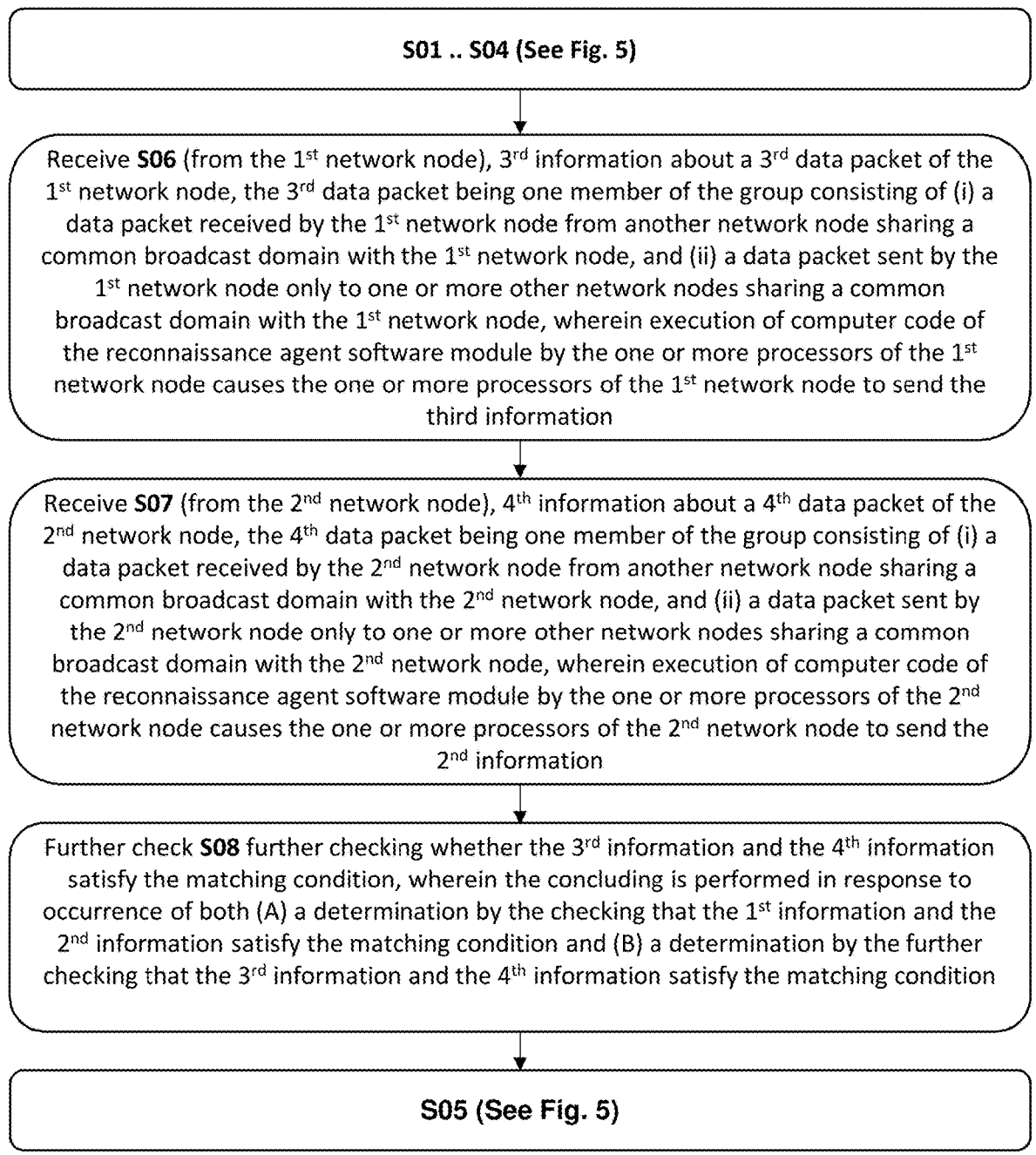

In some embodiments, as illustrated in the flow chart in FIG. 6, the method comprises additional steps which are preferably performed after Steps S01 through S04 of FIG. 5. Here, too the method is preferably carried out by the PTSM 260:

Step S06 receiving from the first network node 300$_X$, third information about a third data packet of the first network node 300$_X$, the third data packet being one member of the group consisting of (i) a data packet received by the first network node 300$_X$ from another network node 300 sharing a common broadcast domain 500 with the first network node 300$_X$, and (ii) a data packet sent by the first network node 300$_X$ only to one or more other network nodes 300 sharing a common broadcast domain 500 with the first network node 300$_X$, wherein execution of computer code of the RASM 270$_X$ by the one or more processors 240$_X$ of the first network node 300$_X$ causes the one or more processors 240$_X$ of the first network node to send the third information.

Step S07 Receiving, from the second network node, fourth information about a fourth data packet of the second network node 300$_Y$, the fourth data packet being one member of the group consisting of (i) a data packet received by the second network node 300$_Y$ from another network node 300 sharing a common broadcast domain 500 with the second network node 300$_Y$, and (ii) a data packet sent by the second network node 300$_Y$ only to one or more other network nodes 300 sharing a common broadcast domain 500 with the second network node 300$_Y$, wherein execution of computer code of the reconnaissance agent software module by the one or more processors 240$_Y$ of the second network node 300$_Y$ causes the one or more processors 240$_Y$ of the second network node 300$_Y$ to send the second information.

Step S08 Further checking whether the third information and the fourth information satisfy the matching condition.

According to the embodiments illustrated in the flow chart of FIG. 6, the concluding of Step S04-1 is performed in response to occurrence of both (A) a determination by the checking of Step S03 that the first information and the second information satisfy the matching condition and (B) a determination by the further checking of Step S08 that the third information and the fourth information satisfy the matching condition.

Further according to these embodiments, Step S05 of FIG. 5 is carried out after Step S08, rather than directly after Step S04.

FIGS. 7A-7D show further details, according to embodiments, of the system that was illustrated at top level in FIG. 4, for executing a computer-implemented penetration test of a networked system 200 so as to determine a method by which an attacker could compromise the networked system 200.

Figure 7A:
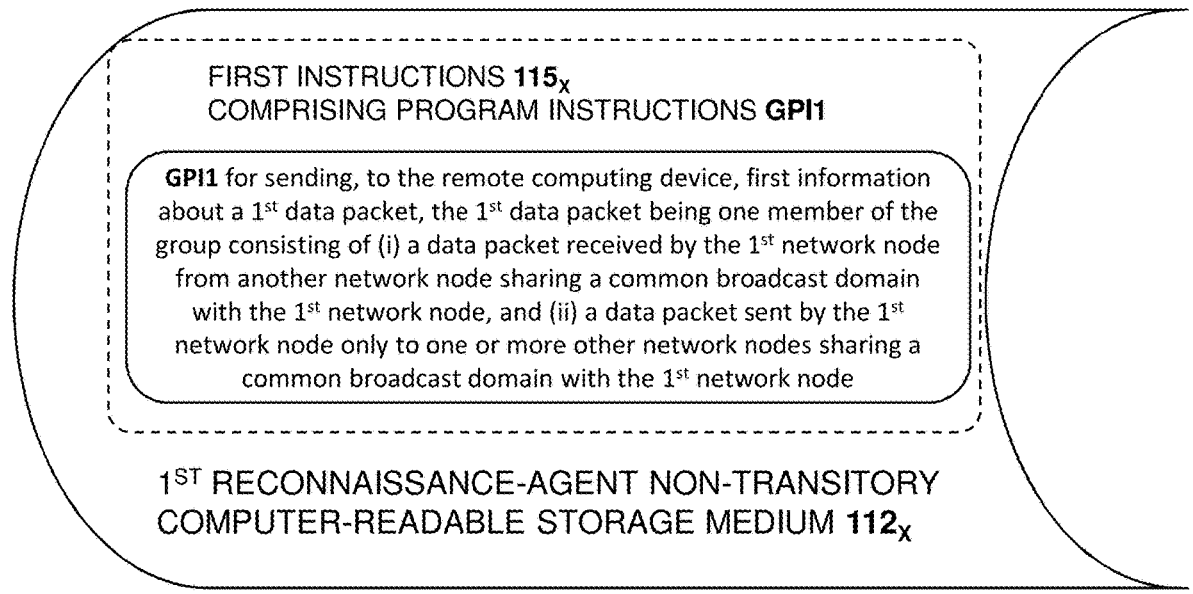
FIGS. 7A and 7B are, respectively, block diagrams of first and second non-transitory computer-readable storage media installed at the first and second network nodes of FIG. 4, comprising respective groups of program instructions, according to embodiments.

As shown in the block diagram of FIG. 7A, the first instructions 115$_X$ stored in first reconnaissance-agent non-transitory computer-readable storage medium 112$_X$, comprise a first group of program instructions GPI1 for sending, to the remote computing device 254, first information about a first data packet, the first data packet being one member of the group consisting of (i) a data packet received by the first network node 300$_X$ from another network node 300 sharing a common broadcast domain 500 with the first network node 300$_X$, and (ii) a data packet sent by the first network node 300$_X$ only to one or more other network nodes 300 sharing a common broadcast domain 500 with the first network node 300$_X$.

Figure 7B:
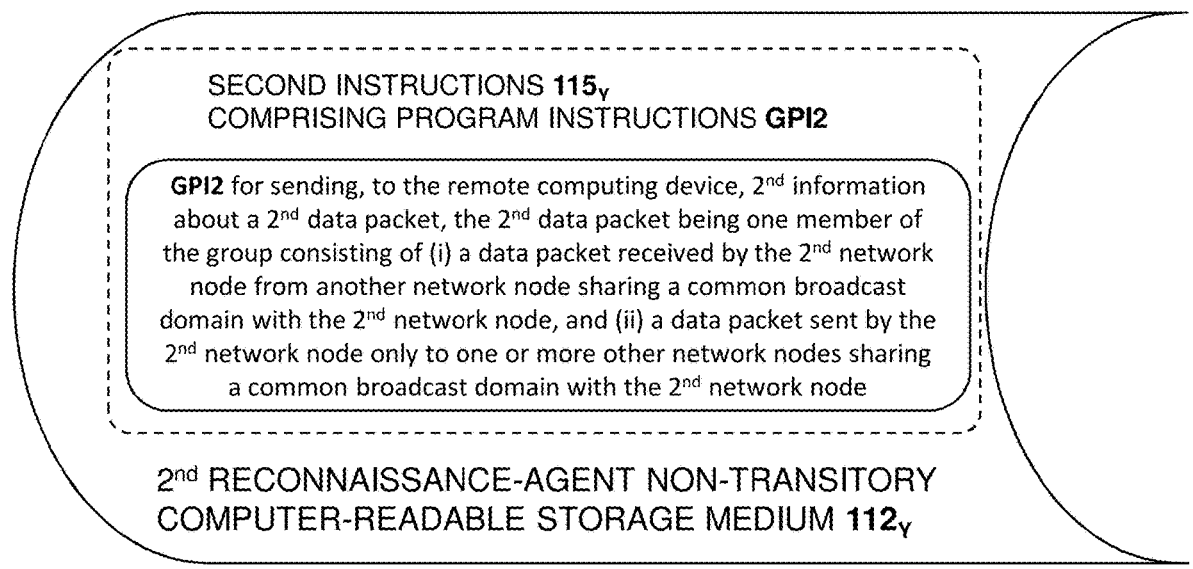

As shown in the block diagram of FIG. 7B, the second instructions 115$_Y$ stored in second reconnaissance-agent non-transitory computer-readable storage medium 112$_Y$, comprise a second group of program instructions GPI2 for sending, to the remote computing device 254, second information about a second data packet, the second data packet being one member of the group consisting of (i) a data packet received by the second network node 300$_Y$ from another network node 300 sharing a common broadcast domain 500 with the second network node 300$_Y$, and (ii) a data packet sent by the second network node 300$_Y$ only to one or more other network nodes 300 sharing a common broadcast domain 500 with the second network node 300$_Y$.

Figure 7D:
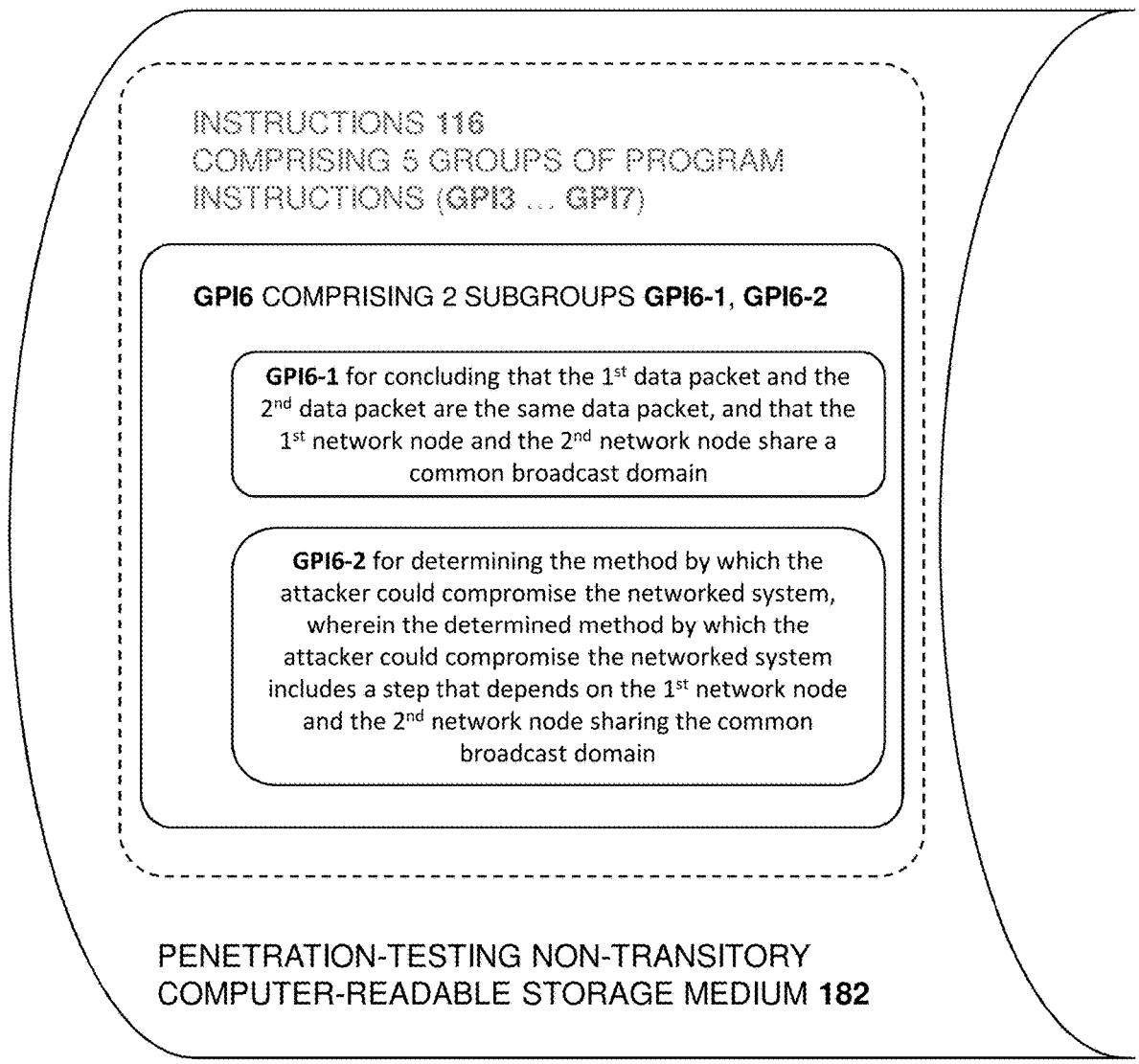
FIG. 7D shows a block diagram showing a detail of one of the groups of program instructions of FIG. 7C.

As illustrated in the block diagrams of FIGS. 7C and 7D, the program instructions 116 stored in penetration testing non-transitory computer-readable storage medium 182, comprise 5 groups of program instructions GPI3 . . . GPI7 for execution by the one or more processors 250 of the remote computing device 254:

Program instructions GPI3 for receiving, from the first network node 300$_X$, first information sent by the first network node 300$_X$ about a first data packet Program instructions GPI4 for receiving, from the second network node $300_Y$, second information sent by the second network node $300_Y$ about a second data packet Program instructions GPI5 for checking whether the first information and the second information satisfy a matching condition Program instructions GPI6 for executing the subgroups of program instructions GPI6-1, GPI6-2 in response to a determination made when executing the program instructions of GPI5 that the first information and the second information satisfy a matching condition:

Program instructions GPI6-1 for concluding that the first data packet and the second data packet are the same data packet, and that the first network node $300_X$ and the second network node $300_Y$ share a common broadcast domain 500

Program instructions GPI6-2 for determining the method by which the attacker could compromise the networked system 200, wherein the determined method by which the attacker could compromise the networked system 200 includes a step that depends on the first network node $300_X$ and the second network node $300_Y$ sharing the common broadcast domain 500

Program instructions GPI7 for reporting the determined method by which the attacker could compromise the networked system 200, wherein the reporting comprises at least one member of the group consisting of (i) causing a display device (not shown) to display a report including information about the determined method by which the attacker could compromise the networked system 200, (ii) recording the report including the information about the determined method by which the attacker could compromise the networked system 200 in a file, and (iii) electronically transmitting the report including the information about the determined method by which the attacker could compromise the networked system 200.

Data Distribution

As discussed earlier with respect to FIG. 3, a data distribution system according to embodiments can comprise a data distribution server software module (DDSSM) 760 installed on a remote computing device 754 and a data distribution agent software module (DDASM) 770 installed on at least some of a plurality of network nodes 800 of a networked system 700.

Figure 8:
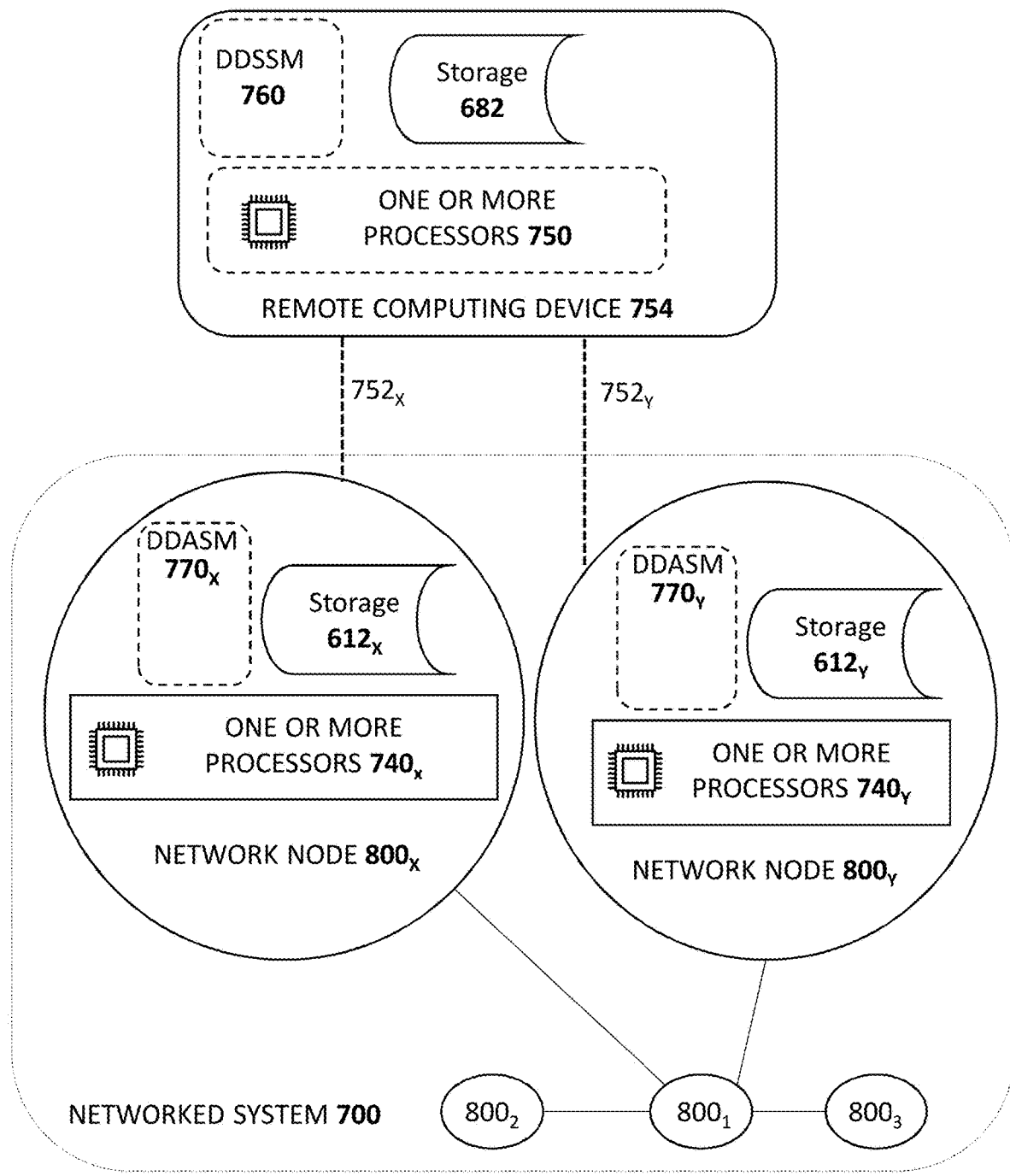
FIG. 8 shows a block diagram of a networked system having first and second network nodes each of which has a data-distribution-agent software module installed therein, and a data distribution remote computing device having a data-distribution-server software module installed therein and in connection with the networked system, according to embodiments.

As illustrated in FIG. 8, a data distribution system can comprise:

A first data distribution agent non-transitory computer-readable storage medium $612_X$ which is associated with the first node $800_X$. This first storage medium $612_X$ is provided for storage of first instructions $615_X$ of a data distribution agent software module $770_X$ for execution by one or more processors $740_X$ of the first network node $800_X$, which is in electronic communication with a remote computing device 754 by communications arrangement $752_X$ (a LAN connection), which alternatively can be an Internet connection or any other suitable connection, including an indirect connection. A data distribution agent software module instance (DDASM) $770_X$ is installed in the network node $800_X$. The first storage medium $612_X$ is shown for convenience as being part of the network node $800_X$ but it can be anywhere as long as the one or more processors $740_X$ can access and execute the instructions $615_X$ stored therein.

A second data distribution agent non-transitory computer-readable storage medium $612_Y$ which is associated with the second node $800_Y$. This second storage medium $612_Y$ is provided for storage of instructions $615_Y$ of a data distribution agent software module 770 for execution by one or more processors $740_Y$ of the second network node $800_Y$, which is also in electronic communication with a remote computing device 754 (by communications arrangement $752_Y$ which can be the same as communications arrangement $752_X$ or separate and/or different). A data distribution software module instance $770_Y$ is installed in the network node $800_Y$. The second storage medium $612_Y$ is also shown for convenience as being part of the network node $800_Y$ but it can be anywhere as long as the one or more processors $740_Y$ can access and execute the instructions $615_Y$ stored therein.

A data distribution non-transitory computer-readable storage medium 682 for storage of instructions 616 of the data distribution server software module 760 for execution by one or more processors 750 of the remote computing device 754. A data distribution server software module 760 is installed in the data distribution remote computing device 754. This storage medium 682 is also shown for convenience as being part of the data distribution remote computing device 754 but it can be anywhere as long as the one or more processors 750 can access and execute the instructions 616 stored therein.

Referring now to FIG. 9, a method is disclosed for distributing a common set of data to multiple network nodes 800 of a networked system 700 by a data distribution system. A data distribution system suitable for carrying out the method comprises (A) a data distribution server software module (DDSSM) 760 installed on a data distribution remote computing device 754 and (B) a data distribution agent software module (DDASM) 770 installed on at least a first network node $800_X$ and a second network node $800_Y$ of the networked system. All steps of the method are preferably carried out by the DDSSM 760. As illustrated by the flow chart in FIG. 9, the method comprises:

Step S11 Receiving, from the first network node $800_X$, first information about a first data packet, the first data packet being one member of the group consisting of (i) a data packet received by the first network node $800_X$ from another network node 800 sharing a common broadcast domain 900 with the first network node $800_X$, and (ii) a data packet sent by the first network node $800_X$ only to one or more other network nodes 800 sharing a common broadcast domain 900 with the first network node $800_X$, wherein execution of computer code of the DDASM $770_X$ by one or more processors $740_X$ of the first network node $800_X$ causes the one or more processors $740_X$ of the first network node $800_X$ to send the first information.

Step S12 Receiving, from the second network node $800_Y$, second information about a second data packet, the second data packet being one member of the group consisting of (i) a data packet received by the second network node $800_Y$ from another network node 800 sharing a common broadcast domain 900 with the second network node $800_Y$, and (ii) a data packet sent by the second network node $800_Y$ only to one or more other network nodes 800 sharing a common broadcast domain 900 with the second network node $800_Y$, wherein execution of computer code of the DDASM $770_Y$ by one or more processors $740_Y$ of the second network node $800_Y$ causes the one or more processors $740_Y$ of the second network node $800_Y$ to send the second information.

Step S13 Checking whether the first information and the second information satisfy a matching condition.

Step S14 In response to a determination by the checking in Step S13 that the first information and the second information satisfy a matching condition, carrying out the following sub-steps:

Sub-step S14-1 Concluding that the first data packet and the second data packet are a same data packet, and that the first network node $800_X$ and the second network node $800_Y$ share a common broadcast domain 900, and Sub-Step S14-2 Delivering the common set of data to multiple network nodes of the common broadcast domain, the delivering comprising:

(A) transmitting the common set of data to the first network node, and (B) causing the first network node to transmit the common set of data from the first network node to the second network node.

Figure 10:
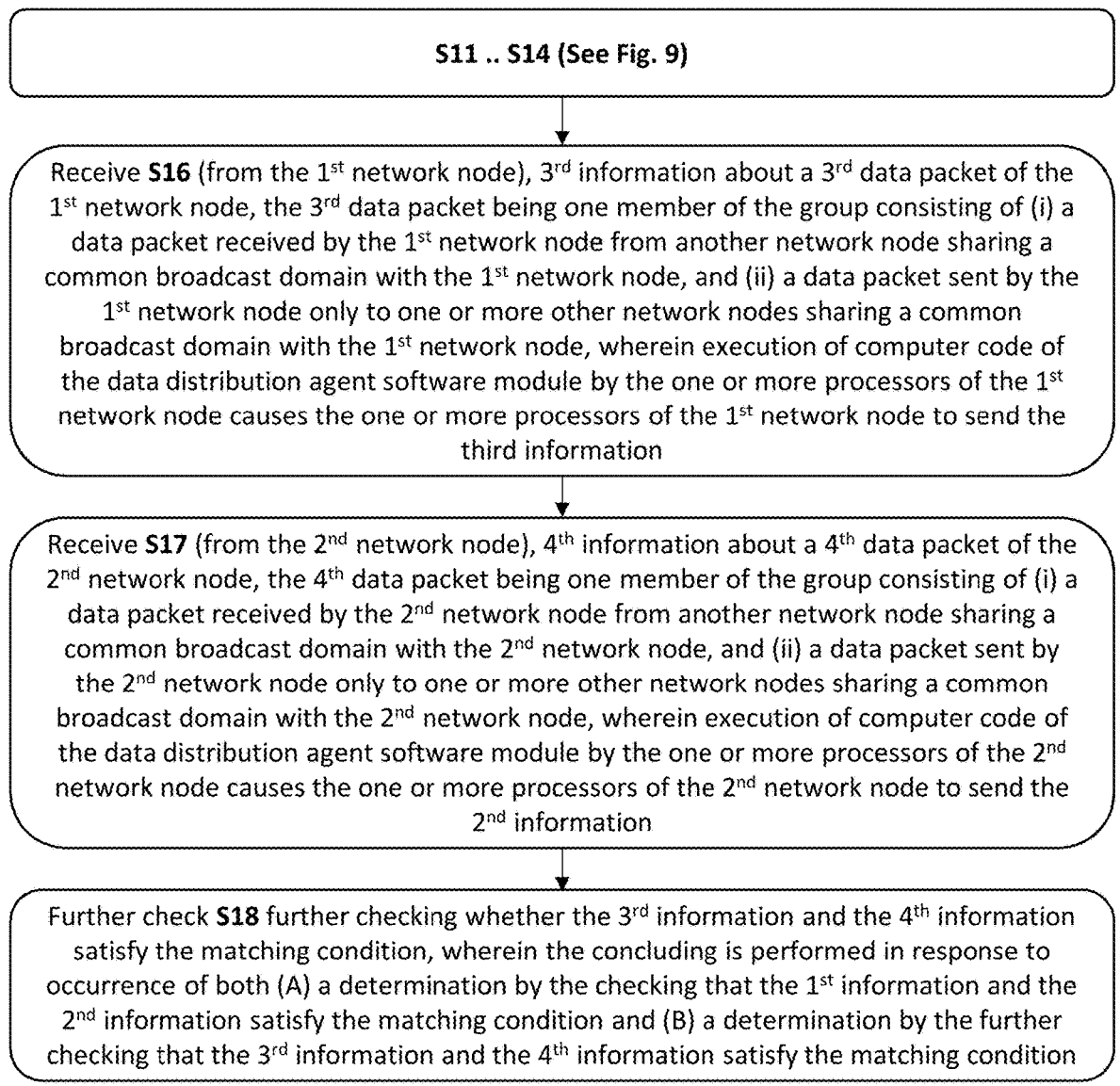

In some embodiments, as illustrated in the flow chart in FIG. 10, the method comprises additional steps which are preferably performed after Steps S11 through S14 of FIG. 9. Here, too the method is preferably carried out by the DDSSM 760.

Step S16 receiving from the first network node $800_X$, third information about a third data packet of the first network node $800_X$, the third data packet being one member of the group consisting of (i) a data packet received by the first network node $800_X$ from another network node 800 sharing a common broadcast domain 900 with the first network node $800_X$, and (ii) a data packet sent by the first network node $800_X$ only to one or more other network nodes 800 sharing a common broadcast domain 900 with the first network node $800_X$, wherein execution of computer code of the DDASM $770_X$ by the one or more processors $740_X$ of the first network node $800_X$ causes the one or more processors $740_X$ of the first network node $800_X$ to send the third information.

Step S17 Receiving, from the second network node $800_Y$, fourth information about a fourth data packet of the second network node $800_Y$, the fourth data packet being one member of the group consisting of (i) a data packet received by the second network node $800_Y$ from another network node 800 sharing a common broadcast domain 900 with the second network node $800_Y$, and (ii) a data packet sent by the second network node $800_Y$ only to one or more other network nodes 800 sharing a common broadcast domain 900 with the second network node $800_Y$, wherein execution of computer code of the data-distribution-agent software module by the one or more processors $740_Y$ of the second network node $800_Y$ causes the one or more processors $740_Y$ of the second network node $800_Y$ to send the second information.

Step S18 Further checking whether the third information and the fourth information satisfy the matching condition.

According to the embodiments illustrated in the flow chart of FIG. 10, the concluding of Step S14-1 is performed in response to occurrence of both (A) a determination by the checking of Step S13 that the first information and the second information satisfy the matching condition and (B) a determination by the further checking of Step S18 that the third information and the fourth information satisfy the matching condition.

FIGS. 11A-11D show further details, according to embodiments, of the data distribution system that was illustrated at top level in FIG. 8, for distributing a common set of data to multiple network nodes 800 of a networked system 700.

Figure 11A:
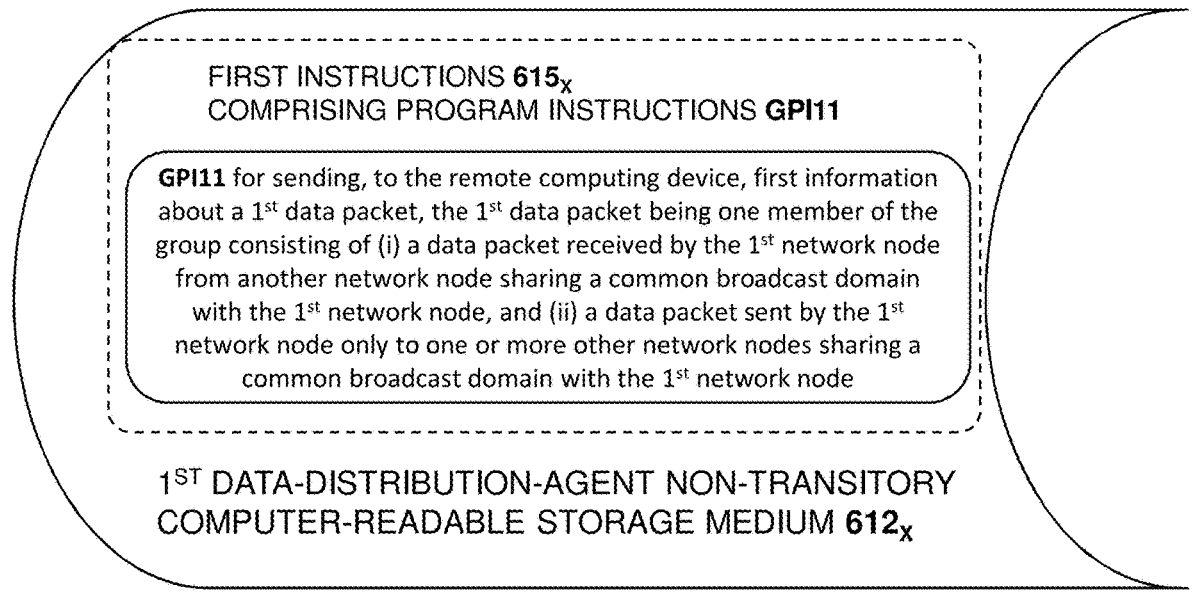
FIGS. 11A and 11B are, respectively, block diagrams of first and second non-transitory computer-readable storage media installed at the first and second network nodes of FIG. 8, comprising respective groups of program instructions, according to embodiments.

As shown in the block diagram of FIG. 11A, the first instructions $615_X$ stored in first distribution-agent non-transitory computer-readable storage medium $612_X$, comprise a first group of program instructions GPI11 for sending, to the remote computing device 754, first information about a first data packet, the first data packet being one member of the group consisting of (i) a data packet received by the first network node $800_X$ from another network node 800 sharing a common broadcast domain 900 with the first network node $800_X$, and (ii) a data packet sent by the first network node $800_X$ only to one or more other network nodes 800 sharing a common broadcast domain 900 with the first network node $800_X$.

Figure 11B:
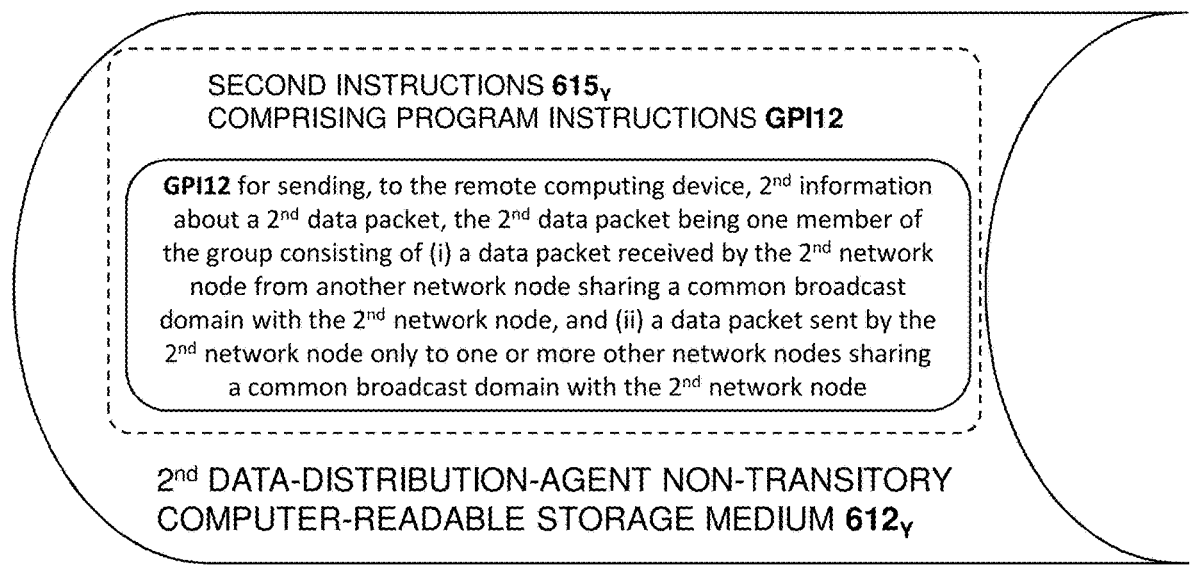

As shown in the block diagram of FIG. 11B, the second instructions $615_Y$ stored in second distribution-agent non-transitory computer-readable storage medium $612_Y$, comprise a second group of program instructions GPI12 for sending, to the remote computing device 754, second information about a second data packet, the second data packet being one member of the group consisting of (i) a data packet received by the second network node $800_Y$ from another network node 800 sharing a common broadcast domain 900 with the second network node $800_Y$, and (ii) a data packet sent by the second network node $800_Y$ only to one or more other network nodes 800 sharing a common broadcast domain 900 with the second network node $800_Y$.

Figure 11C:
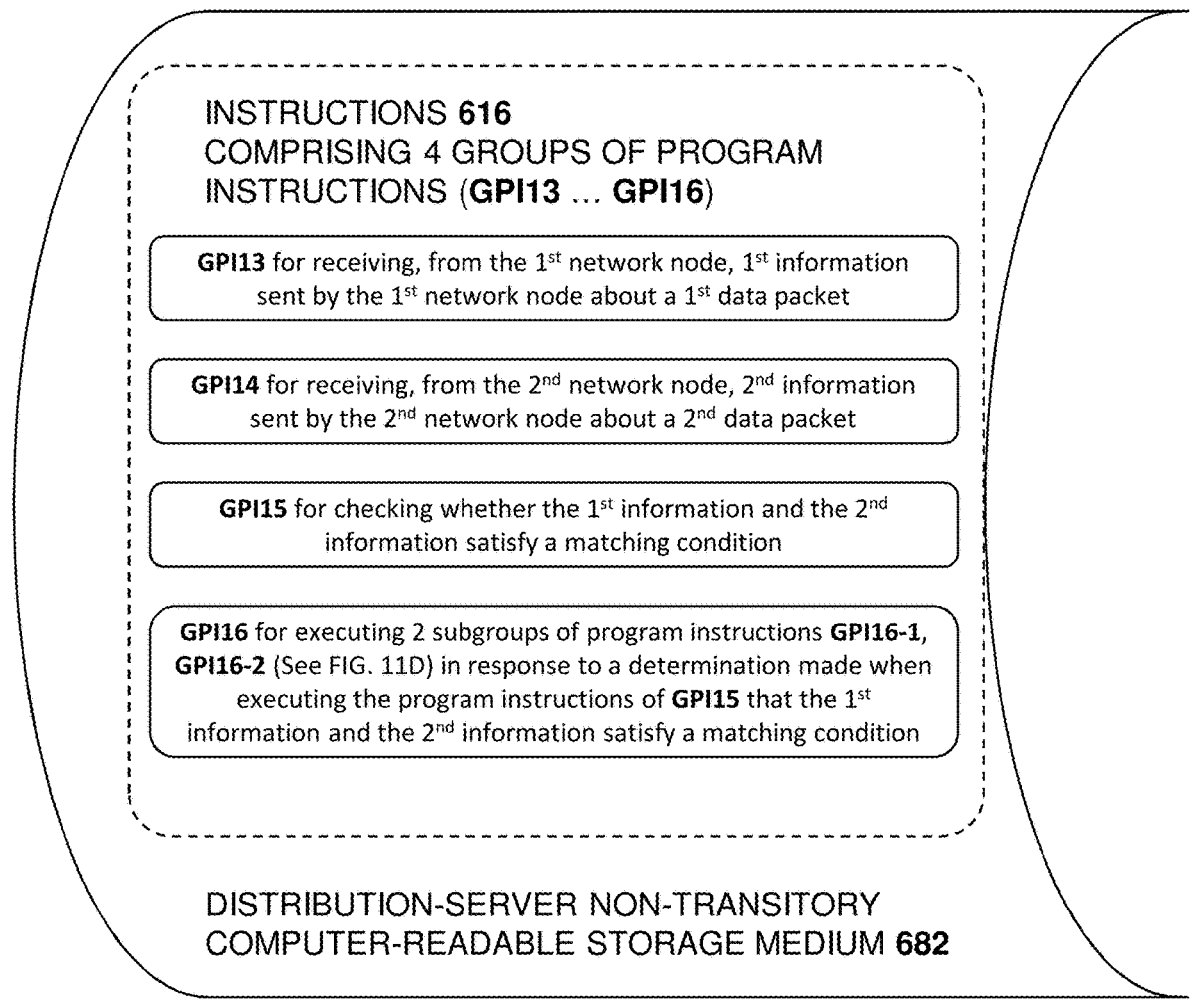
FIG. 11C shows a block diagram of a non-transitory computer-readable storage medium installed at the data distribution remote computing device of FIG. 8, comprising groups of program instructions, according to embodiments.
Figure 11D:
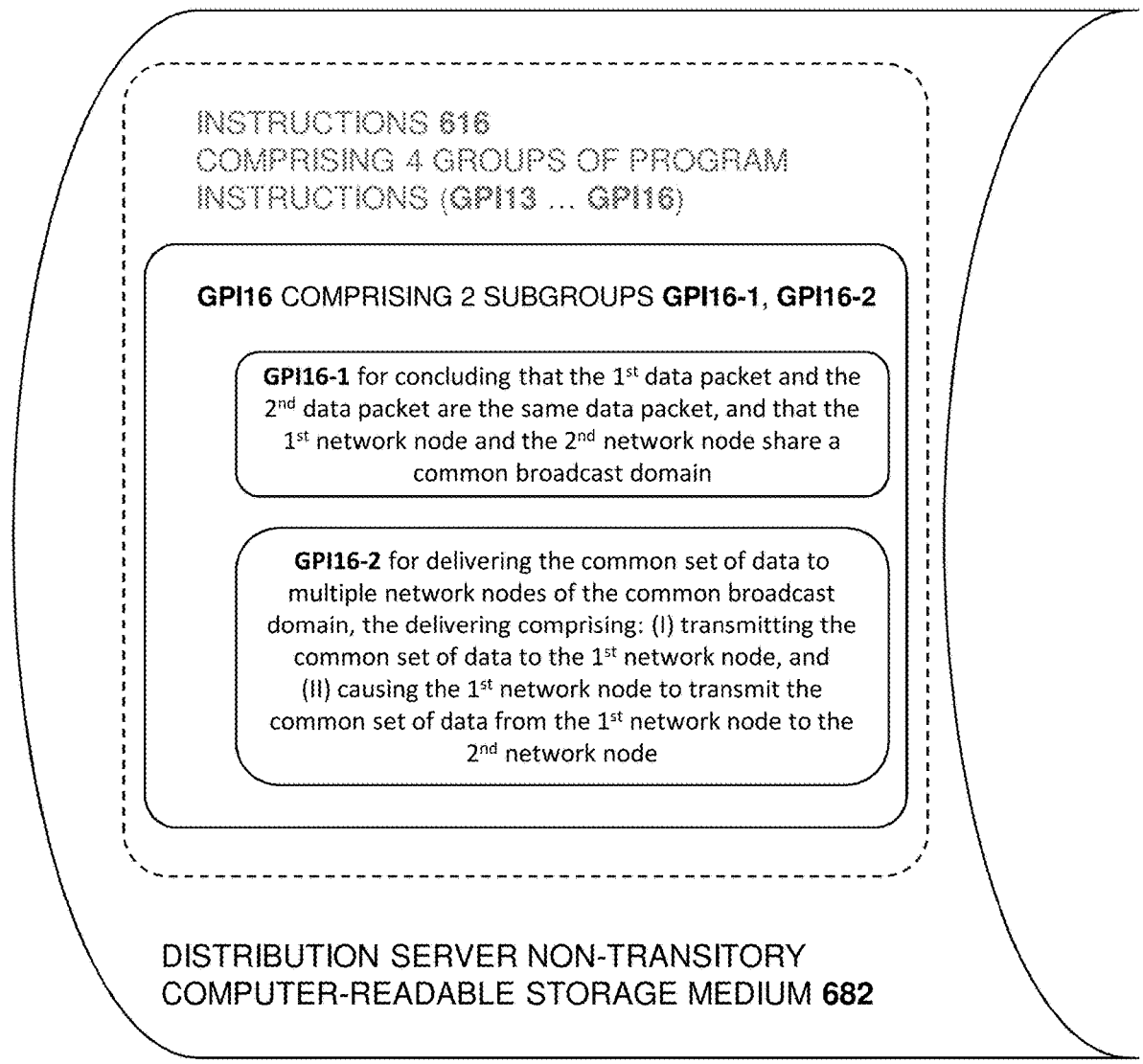
FIG. 11D shows a block diagram showing a detail of one of the groups of program instructions of FIG. 11C.

As illustrated in the block diagrams of FIGS. 11C and 11D, the program instructions 616 stored in distribution-server non-transitory computer-readable storage medium 682 comprise 4 groups of program instructions GPI13 . . . GPI16 for execution by the one or more processors 750 of the remote computing device 754:

Program instructions GPI13 for receiving, from the first network node $800_X$, first information sent by the first network node $800_X$ about a first data packet Program instructions GPI14 for receiving, from the second network node $800_Y$, second information sent by the second network node $800_Y$ about a second data packet Program instructions GPI15 for checking whether the first information and the second information satisfy a matching condition Program instructions GPI16 for executing the subgroups of program instructions GPI6-1, GPI6-2 in response to a determination made when executing the program instructions of GPI15 that the first information and the second information satisfy a matching condition:

Program instructions GPI6-1 for concluding that the first data packet and the second data packet are the same data packet, and that the first network node $800_X$ and the second network node $800_Y$ share a common broadcast domain 900

Program instructions GPI6-2 for delivering the common set of data to multiple network nodes 800 of the common broadcast domain 900, the delivering comprising: (I) transmitting the common set of data to the first network node $800_X$, and (II) causing the first network node $800_X$ to transmit the common set of data from the first network node $800_X$ to the second network node $800_Y$.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

Definitions

This disclosure should be interpreted according to the definitions below. In case of a contradiction between the definitions in this Definitions section and other sections of this disclosure, this section should prevail.
In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.
3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.
4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.
5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.
6. "network node of a networked system" or "node of a networked system"—Any computing device or peripheral device that belongs to the networked system.
7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation".

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system. The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign"—A specific run of a specific test of a specific networked system by the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "attacker" or "threat actor"—An entity, whether a single person, a group of persons or an organization, that might conduct an attack against a networked system by penetrating it for uncovering its security vulnerabilities and/or for compromising it.

21. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

22. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

23. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

24. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

25. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.
26. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.
27. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.
28. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

29. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.
30. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.
31. "resource of a networked system"—A file in a network node of the networked system, a folder in a network node of the networked system, credentials of a user of the networked system, a peripheral device of a network node of the networked system, or a peripheral device directly attached to a network of the networked system.
32. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.
33. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.
34. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

35. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

36. "session-hijacking attack"—a cyber-attack where a valid communication session between two network nodes in a networked system is used by an attacker to gain unauthorized access to information or services in the networked computer system.

37. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

38. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

39. "administrator of a network node"—Any person that is authorized, among other things, to define or change at least one rule controlling at least one of an access right, a permission, a priority and a configuration in the network node.

40. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

41. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

42. "explicitly selecting"—Directly and clearly selecting, by a human user, of one option out of multiple options available to the human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

43. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

44. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

45. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

46. "random selection"—A selection that depends on a random or pseudo-random factor. Different possible outcomes in a random selection do not necessarily have the same probabilities of being selected.

47. "hash function"—any function that maps data of arbitrary size to data of fixed size, where the output in smaller in size than the input. For example, the function D=A XOR B XOR C (where A, B, C and D are all 32 bit unsigned numbers) is a hash function, as it maps an input of size 3×32=96 bits to an output of size 32 bits.

48. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

49. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

50. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

51. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat".

Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

52. "broadcast domain"—A logical division of a networked system, in which all network nodes can reach each other by broadcasting at the data link layer. In other words, each network node in a broadcast domain can transmit a data link broadcast message that is addressed to all other network nodes within its broadcast domain.

53. "data packet", "network packet" or "network message"—A formatted unit of data carried by a computer network.

54. "data packet of a network node"—A data packet that is either sent by the network node or received by the network node.

55. "data packet received by a receiving network node from a sending network node"—A data packet that was composed by the sending network node and consumed by the receiving network node.

A network node that is a mediator that receives the data packet from another node and delivers it to the receiving network node is not considered to be a sending node of the data packet. Therefore, a layer 3 data packet originating in a remote node of a remote broadcast domain and reaching the receiving network node through a local node in its local broadcast domain is said to be sent by the remote node and not by the local node.

Similarly, a network node that is a mediator that receives the data packet from the sending network node and delivers it to another node without consuming it is not considered to be a receiving node of the data packet. Therefore, a layer 3 data packet sent by its composing node to a local node in its local broadcast domain that does not consume it and the local node in turn delivers the data packet to a remote node in a remote broadcast domain that does consume it, is said to be received by the remote node and not by the local node.

56. "matching condition" (for given first information and second information)—A Boolean condition that depends on the content of both the first information and the second information, where satisfying the condition implies with high probability that the first information and the second information are related to a common data packet.

For example, a matching condition may be satisfied if and only if the first and second information share a common source MAC address, a matching condition may be satisfied if and only if the first and second information share a common timestamp, or a matching condition may be satisfied if and only if the first and second information share a common protocol type.

A matching condition does not necessarily require equality of values in the first and second information—e.g. a matching condition may be satisfied if and only if a value in the first information is different from a value in the second information, or if and only if a value in the first information is within a given range from a value in the second information.

A matching condition does not necessarily depend on a single value in each of the first and second information—e.g. a matching condition may be satisfied if and only if the first and second information share both a common protocol type and a common timestamp.

A matching condition may be a compound condition that is composed from simpler matching conditions connected by any combination of the "and", "or" and "not" logical operators. For example, a matching condition may be satisfied if and only if the first and second information share a common source MAC address, and additionally satisfy at least one of (i) the first and second information have different inbound/outbound directions, and (ii) the first and second information have timestamps that differ by not more than a given value.

57. "data distribution"—A process in which the same data is provided to multiple network nodes of a networked system. Unless otherwise explicitly specified, a reference to data distribution should be understood as referring to automated data distribution.

58. "data distribution system"—A system capable of performing data distribution, regardless if composed of hardware, software or combination of both.

59. "data distribution agent software module", "data distribution client agent", "data distribution agent" or "distribution agent"—A software module that can be installed on a network node of a networked system and can be executed by a processor of that network node for partially implementing a data distribution process occurring within the networked system.

A data distribution agent must be capable, when executed by a processor of the network node in which it is installed, of receiving data to be distributed from another computing device and of transmitting the data to be distributed to one or more other network nodes in its local broadcast domain.

A data distribution agent may be persistently installed on a network node, where "persistently" means that once installed on a network node the data distribution agent survives a reboot of the network node. Alternatively, a data distribution agent may be non-persistently installed on a network node, where "non-persistently" means that the data distribution agent does not survive a reboot of the network node and consequently should be installed again on the network node for a new data distribution process in which the network node takes part, if the network node was rebooted since the previous data distribution process in which it took part.

60. "data distribution server software module" or "remote computing device data distribution software module"—A software module that implements the full functionality of a data distribution system, except for the functionality implemented by data distribution agents, if such agents are used in the implementation of the data distribution system.

The data distribution software module may be installed and executed on a single computing device or comprise multiple software components that reside on multiple computing devices.

61. "data distribution remote computing device" (with respect to a given networked system)—A computing device that executes software implementing part or all of the data distribution server software module that is used for data distribution in the given networked system.

A data distribution remote computing device may be (i) outside of the given networked system, or (ii) inside the given networked system. In other words, a data distribution remote computing device is not necessarily physically remote from the given networked system. It is called "remote" to indicate its functionality is logically separate from the functionality of the given networked system.

A data distribution remote computing device may (i) be a dedicated computing device that is dedicated only to doing data distribution, or (ii) also implement other functionality not directly related to data distribution.

A data distribution remote computing device is not limited to be a single physical device with a single processing unit. It may be implemented by multiple separate physical devices packaged in separate packages that may be located at different locations. Each of the separate physical devices may include one or multiple processing units.

A data distribution remote computing device may be (i) a physical computing device, or (ii) a virtual machine running inside a physical computing device on top of a hosting operating system.

The invention claimed is:

1. A method for distributing a common set of data to multiple network nodes of a networked system by a data distribution system, where the data distribution system comprises (A) a data distribution server software module installed on a data distribution remote computing device and (B) a data distribution agent software module installed on at least a first network node and a second network node of the networked system, the method for distributing the common set of data comprising:

a. receiving, by the data distribution server software module and from the first network node, first information about a first data packet, the first data packet being one member of the group consisting of (i) a data packet received by the first network node from another network node sharing a common broadcast domain with the first network node, and (ii) a data packet sent by the first network node only to one or more other network nodes sharing a common broadcast domain with the first network node, wherein execution of computer code of the data distribution agent software module by one or more processors of the first network node causes the one or more processors of the first network node to send the first information;

b. receiving, by the data distribution server software module and from the second network node, second information about a second data packet of the second network node, the second data packet being one member of the group consisting of (i) a data packet received by the second network node from another network node sharing a common broadcast domain with the second network node, and (ii) a data packet sent by the second network node only to one or more other network nodes sharing a common broadcast domain with the second network node, wherein execution of computer code of the data distribution agent software module by one or more processors of the second network node causes the one or more processors of the second network node to send the second information;

c. checking, by the data distribution server software module, whether the first information and the second information satisfy a matching condition; and d. in response to a determination by the checking that the first information and the second information satisfy the matching condition, carrying out the following steps:

i. concluding, by the data distribution server software module, that the first data packet and the second data packet are a same data packet, and that the first network node and the second network node share a common broadcast domain; and ii. delivering the common set of data to multiple network nodes of the common broadcast domain, the delivering comprising:

(A) transmitting the common set of data to the first network node, and (B) causing the first network node to transmit the common set of data from the first network node to the second network node.

2. The method of claim 1, wherein the transmitting of the common set of data to the first network node is performed by the data distribution remote computing device.

3. The method of claim 1, wherein the transmitting of the common set of data to the first network node is performed by a computing device other than the data distribution remote computing device.

4. The method of claim 1, wherein the common set of data includes media data.

5. The method of claim 1, wherein the common set of data includes an installation package of a software application.

6. The method of claim 1, wherein the common set of data includes an update for a software application.

7. The method of claim 1, wherein the first data packet is a member of the data packets group consisting of an Address Resolution Protocol (ARP) data packet, a Link-Local Multicast Name Resolution (LLMNR) data packet and a NetBIOS over TCP/IP Name Service (NBNS) data packet.

8. The method of claim 1, wherein the first data packet is an Internet Protocol (IP) data packet including an IP destination address that is an IP broadcast address.

9. The method of claim 1, wherein (i) the first information includes a first indication that indicates whether the first data packet is an inbound or an outbound data packet, (ii) the second information includes a second indication that indicates whether the second data packet is an inbound or an outbound data packet, and (iii) a necessary condition for the first information and the second information to satisfy the matching condition is that the first indication is different from the second indication.

10. The method of claim 1, wherein (i) the first information includes a value of a given field in the first data packet, (ii) the second information includes a value of the given field in the second data packet, and (iii) a necessary condition for the first information and the second information to satisfy the matching condition is that the value of the given field in the first data packet equals the value of the given field in the second data packet.

11. The method of claim 10, wherein the given field is a member of the group consisting of an Internet Protocol (IP) address field, a Media Access Control (MAC) address field, and a protocol type field.

12. The method of claim 1, wherein (i) the first information includes respective values of multiple given fields in the first data packet, (ii) the second information includes respective values of the multiple given fields in the second data packet, and (iii) a necessary condition for the first information and the second information to satisfy the matching condition is that for each specific given field of the multiple given fields, the respective value in the first data packet equals the respective value in the second data packet.

13. The method of claim 12, wherein the multiple given fields include an Internet Protocol (IP) address field and a Media Access Control (MAC) address field.

14. The method of claim 1, wherein (i) the first information includes a first result of a first computation based on corresponding values of one or more given fields in the first data packet, (ii) the second information includes a second result of a second computation based on corresponding values of the one or more given fields in the second data packet, and (iii) a necessary condition for the first information and the second information to satisfy the matching condition is that the first result equals the second result.

15. The method of claim 14, wherein the first computation is a computation of a hash function.

16. The method of claim 14, wherein the first computation is a computation of an Exclusive OR (XOR) function.

17. The method of claim 1, wherein a necessary condition for the first information and the second information to satisfy the matching condition is that an absolute value of a difference in time between the receiving of the first information and the receiving of the second information is lower than a given threshold.

18. The method of claim 1, wherein a necessary condition for the first information and the second information to satisfy the matching condition is that an absolute value of a difference between a first time stamp included in the first information and a second time stamp included in the second information is lower than a given threshold.

19. The method of claim 1, further comprising:
e. receiving, by the data distribution server software module and from the first network node, third information about a third data packet of the first network node, the third data packet being one member of the group consisting of (i) a data packet received by the first network node from another network node sharing a common broadcast domain with the first network node, and (ii) a data packet sent by the first network node only to one or more other network nodes sharing a common broadcast domain with the first network node, wherein execution of computer code of the data distribution agent software module by the one or more processors of the first network node causes the one or more processors of the first network node to send the third information;
f. receiving, by the data distribution server software module and from the second network node, fourth information about a fourth data packet of the second network node, the fourth data packet being one member of the group consisting of (i) a data packet received by the second network node from another network node sharing a common broadcast domain with the second network node, and (ii) a data packet sent by the second network node only to one or more other network nodes sharing a common broadcast domain with the second network node, wherein execution of computer code of the data distribution agent software module by the one or more processors of the second network node causes the one or more processors of the second network node to send the fourth information;
g. further checking, by the data distribution server software module, whether the third information and the fourth information satisfy the matching condition,
wherein the concluding is performed in response to occurrence of both (A) a determination by the further checking that the third information and the fourth information satisfy the matching condition and (B) a determination by the checking that the first information and the second information satisfy the matching condition.

20. A data distribution system for distributing a common set of data to multiple network nodes of a networked system, the networked system comprising a plurality of network nodes interconnected by one or more networks, the data distribution system comprising:
a. a first distribution-agent non-transitory computer-readable storage medium for storage of instructions for execution by one or more processors of a first network node, the first network node being in electronic communication with a data distribution remote computing device, the first distribution-agent non-transitory computer-readable storage medium having stored therein first instructions, that when executed by the one or more processors of the first network node, cause the one or more processors of the first network node to send, to the data distribution remote computing device, first information about a first data packet, the first data packet being one member of the group consisting of (i) a data packet received by the first network node from another network node sharing a common broadcast domain with the first network node, and (ii) a data packet sent by the first network node only to one or more other network nodes sharing a common broadcast domain with the first network node;
b. a second distribution-agent non-transitory computer-readable storage medium for storage of instructions for execution by one or more processors of a second network node, the second network node being in electronic communication with the data distribution remote computing device, the second reconnaissance-agent non-transitory computer-readable storage medium having stored therein second instructions, that when executed by the one or more processors of the second network node, cause the one or more processors of the second network node to send, to the data distribution remote computing device, second information about a second data packet of the second network node, the second data packet being one member of the group consisting of (i) a data packet received by the second network node from another network node sharing a common broadcast domain with the second network node, and (ii) a data packet sent by the second network node only to one or more other network nodes sharing a common broadcast domain with the second network node;
c. a distribution-server non-transitory computer-readable storage medium for storage of instructions for execution by one or more processors of the data distribution remote computing device, the distribution-server non-transitory computer-readable storage medium having stored therein:
  i. third instructions, that when executed by the one or more processors of the data distribution remote computing device, cause the one or more processors of the data distribution remote computing device to receive, from the first network node, the first information sent by the first network node,
  ii. fourth instructions, that when executed by the one or more processors of the data distribution remote computing device, cause the one or more processors of the data distribution remote computing device to receive, from the second network node, the second information sent by the second network node,
  iii. fifth instructions, that when executed by the one or more processors of the data distribution remote computing device, cause the one or more processors of the data distribution remote computing device to check whether the first information and the second information satisfy a matching condition, and
  iv. sixth instructions, that when executed by the one or more processors of the data distribution remote computing device, cause the one or more processors of the data distribution remote computing device to carry out the following steps in response to a determination made by executing the fifth instructions that the first information and the second information satisfy the matching condition:
    A. concluding that the first data packet and the second data packet are a same data packet, and that the first network node and the second network node share a common broadcast domain, and
    B. delivering the common set of data to multiple network nodes of the common broadcast domain shared by the first network node and the second network node, the delivering comprising:
      (I) transmitting the common set of data to the first network node, and
      (II) causing the first network node to transmit the common set of data from the first network node to the second network node.

* * * * *